(12) United States Patent
Yun

(10) Patent No.: US 11,843,925 B2
(45) Date of Patent: Dec. 12, 2023

(54) ADAPTIVE DELAY DIVERSITY FILTER AND ECHO CANCELLATION APPARATUS AND METHOD USING THE SAME

(71) Applicant: AUZDSP CO., LTD., Seoul (KR)

(72) Inventor: Dong Un Yun, Seoul (KR)

(73) Assignee: AUZDSP CO., LTD., Seoul (KR)

( * ) Notice: Subject to any disclaimer, the term of this patent is extended or adjusted under 35 U.S.C. 154(b) by 20 days.

(21) Appl. No.: 17/378,413

(22) Filed: Jul. 16, 2021

(65) Prior Publication Data

US 2022/0053268 A1 Feb. 17, 2022

Related U.S. Application Data

(63) Continuation-in-part of application No. PCT/KR2020/014484, filed on Oct. 22, 2020.

(51) Int. Cl.
*H04R 3/00* (2006.01)
*G10K 11/178* (2006.01)
(Continued)

(52) U.S. Cl.
CPC ............. *H04R 3/02* (2013.01); *G10K 11/178* (2013.01); *G10L 21/02* (2013.01)

(58) Field of Classification Search
CPC . H04R 3/00; H04R 3/005; H04R 3/02; H04R 3/04; G10K 11/16; G10K 11/178;
(Continued)

(56) References Cited

U.S. PATENT DOCUMENTS 5,548,642 A * 8/1996 Diethorn ................. H04M 3/56
370/290
5,553,014 A * 9/1996 De Leon, II .......... H04M 9/082
708/322
(Continued)

FOREIGN PATENT DOCUMENTS

JP 3837685 B2 * 10/2006 ........... G10K 11/178
JP 4709714 B2 * 6/2011 ............... H04R 3/02
(Continued)

OTHER PUBLICATIONS

Buchner et al., "Generalized multichannel frequency-domain adaptive filtering: efficient realization and application to hands-free speech communication," Signal Processing, vol. 85, (2005), pp. 549-570.
(Continued)

*Primary Examiner* — Thang V Tran
(74) *Attorney, Agent, or Firm* — TraskBritt

(57) ABSTRACT

An adaptive filter and an echo cancellation apparatus and method using the same, utilize an adaptive delay diversity filter for coping with the situation in which variation in a time delay between a reference signal and a target signal of an adaptive filter is large. The adaptive delay diversity filter includes multiple sub-filters, each of which generates output through filtering by utilizing a signal, obtained by applying different time delay values to the reference signal, as a reference signal, and selects the best output value among generated output values of the multiple sub-filters, as an output value of the adaptive delay diversity filter. Further, the adaptive delay diversity filter includes a means for reducing a computational load.

25 Claims, 20 Drawing Sheets

(51) Int. Cl.
*G10L 21/02* (2013.01)
*H04R 3/02* (2006.01)

(58) Field of Classification Search
CPC ......... G10K 11/1781; G10K 11/17815; G10K 11/17817; G10K 11/17823; G10K 11/17828; G10K 11/17854; G10K 11/17879; G10L 21/00; G10L 21/02; G10L 21/0208; G10L 21/02082; G10L 21/0224; H04B 7/23; H04B 7/237; H04M 9/082
See application file for complete search history.

(56) References Cited

U.S. PATENT DOCUMENTS

| | | | |
|---|---|---|---|
| 5,610,909 A * | 3/1997 | Shaw | H04M 9/082 370/291 |
| 5,721,772 A * | 2/1998 | Haneda | H04M 9/082 379/345 |
| 7,366,118 B2 | 4/2008 | Handel et al. | |
| 8,170,226 B2 * | 5/2012 | Prakash | H04M 9/082 379/406.01 |
| 9,113,240 B2 | 8/2015 | Ramakrishnan et al. | |
| 9,167,342 B2 | 10/2015 | Ahgren | |
| 9,438,854 B2 | 9/2016 | Cho | |
| 10,068,585 B2 * | 9/2018 | Misawa | G10L 15/22 |
| 10,229,698 B1 * | 3/2019 | Chhetri | H04R 3/005 |
| 2006/0008076 A1 * | 1/2006 | Okumura | H04R 3/02 379/406.01 |
| 2007/0258578 A1 * | 11/2007 | Hirai | H04R 3/02 379/406.01 |
| 2008/0273716 A1 * | 11/2008 | Saito | H04M 9/082 381/93 |
| 2010/0272251 A1 | 10/2010 | Banba et al. | |
| 2017/0076710 A1 * | 3/2017 | Ushakov | G10L 21/0208 |

FOREIGN PATENT DOCUMENTS

| | | | | |
|---|---|---|---|---|
| JP | 2020199809 A | * | 12/2020 | ........... B60W 30/12 |
| KR | 10-2010-0116693 A | | 11/2010 | |
| KR | 10-2013-0076947 A | | 7/2013 | |
| KR | 10-2015-0096424 A | | 8/2015 | |
| KR | 10-2017-0052056 A | | 5/2017 | |
| KR | 10-2019-0034807 A | | 4/2019 | |

OTHER PUBLICATIONS

Buchner et al., "Multichannel Frequency-Domain Adaptive Filtering with Application to Acoustic Echo Cancellation," Adaptive Signal Processing; Chapter 4, Springer (2003) pp. 95-129.
Haykin, Chapter 13 "Recursive Least-Squares Algorithm" of the book "Adaptive Filter Theory", (1996) pp. 562-588.
Paez-Borrallo et al., "On the Implementation of a Partitioned Block Frequency Domain Adaptive Filter (PBFDAF) for Long Acoustic Echo Cancellation," Signal Processing, vol. 27, (1992), pp. 301-315.

* cited by examiner

ADAPTIVE DELAY DIVERSITY FILTER AND ECHO CANCELLATION APPARATUS AND METHOD USING THE SAME

CROSS-REFERENCE TO RELATED APPLICATIONS

Pursuant to 35 U.S.C. § 111(a), this application is a continuation-in-part of International Patent Application PCT/KR2020/014484, filed Oct. 22, 2020, which claims the benefit of the Republic of Korea Patent Application Serial No. 10-2020-0100981, filed Aug. 12, 2020, the disclosure of each of which is hereby incorporated herein in its entirety by this reference.

TECHNICAL FIELD

The present disclosure relates generally to an adaptive filter and an echo cancellation apparatus and method using the adaptive filter, and more particularly to an adaptive delay diversity filter and an echo cancellation apparatus and method using the adaptive delay diversity filter.

BACKGROUND

In an electronic device such as a smartphone, when audio data generated by executing an application is played out through the speaker, the audio data goes through software modules asynchronously where audio data is processed and finally arrives at the speaker. Due to these asynchronous transmission characteristics, there is a delay until audio data generated from the application is played out through the speaker, and this delay varies with the operating environment of the electronic device, for example, the hardware characteristics of the electronic device, the type or number of applications that are executed, the characteristics of the software module provided for audio data processing, the status of a platform, or the like. Accordingly, the delays, one delay occurring in an audio output process when music is played on the electronic device at a specific time point and, another delay occurring when the same music is played at a different time point may be different from each other.

Meanwhile, in the operating environment of an electronic device, it may be required to collect audio signals for recognizing a user's speech even while playing music or operating a navigation function. In the process of simultaneously playing out the audio data and collecting the user's speech signal, the audio signal output through the speaker may be fed back to the microphone in the form of an echo. Because the audio signal played out through the speaker corresponds to an interfering signal from the standpoint of a speech recognition function, there is a need to cancel the interfering signal. In order to cancel the interfering signal, the sound fed back to the microphone in the form of an echo must be removed using an echo canceller including an adaptive filter.

The above-described adaptive filter estimates an echo using a signal played out through the speaker as a reference signal and using a signal collected at the microphone as a target signal, and cancels the echo by subtracting the estimated signal from the microphone input signal during a filtering procedure. In this case, when variation in the time difference or time delay between the two signals is large, the length of the filter should be increased to cope with the large time delay variation. When this operation is described in detail, the time delay may be classified into two factors, as illustrated in FIG. 1. The two factors include a pure time delay $t_r$, occurring while an audio signal generated by an application passes through a non-acoustic path, and a time delay $t_d$, occurring while the audio signal passes through an acoustic path. For example, the delay $t_r$ occurring in the non-acoustic path may include a delay occurring during a procedure for copying/transferring an audio signal between adjacent software blocks, a delay occurring due to the delay inherent in the filter that is used in the sample rate conversion procedure, and the low-pass/high-pass filtering procedure, or the like. Further, a pure delay may also occur when an audio signal is moved in the form of a digital signal in the physical hardware path. The pure delay $t_r$ causes only a time delay without transforming the moving sounds. In an impulse response of an echo path, a portion corresponding to a period of the pure time delay $t_r$ may ideally have a value of 0.

The delay $t_d$ occurring in the acoustic path may include a delay occurring in a procedure during which sound played out from the speaker flows in the microphone through the process of dispersion and reflection in the air. The delay $t_d$ may occur along with changes in the amplitude and phase of sound. Here, $t_d$ does not greatly vary within a range of about several tens of ms, but $t_r$ varies according to the product (e.g., the type of smartphone), and the range of variation may extend to several hundreds of ms. In particular, considering also the situation in which the audio connection path changes, that is, an environment in which the microphone of a vehicle is used while audio data from a smartphone is played out through the speaker of the vehicle via Bluetooth connection, variation in the delay time may further increase. Generally, an adaptive filter adopts the filter length that is about the sum of $t_r$ and $t_d$, and if the delay variation is large, the filter length of the adaptive filter should be increased, thus this causes problems in which the convergence time of the filter becomes longer, an error signal of filter is increased, and a computational load is also increased.

BRIEF SUMMARY

Technical Problem

The present disclosure has been made keeping in mind the above problems and is intended to provide an adaptive filter, an electronic device using the adaptive filter, and a method for operating the adaptive filter, which can efficiently cancel an echo signal regardless of variation in a time delay occurring between a microphone input signal, which is the target of the adaptive filter, and a speaker output signal, which is a reference.

The present disclosure is intended to provide an adaptive filter, an electronic device using the adaptive filter, and a method for operating the adaptive filter, which can more efficiently support echo signal cancellation in a process for configuring a single smartphone application to be installed in multiple smartphone products.

Further, the present disclosure is intended to provide an adaptive filter, an electronic device using the adaptive filter, and a method for operating the adaptive filter, which can be operated efficiently even when a large change in time delay between a reference signal and a target signal occurs due to a change in the signal travel path.

Furthermore, the present disclosure is intended to provide an adaptive filter, an electronic device using the adaptive filter, and a method for operating the adaptive filter, which realize a short convergence time and a small error by utilizing an adaptive filter to which a short filter length corresponding to about $t_d$, which is a time delay on an actual acoustic path, is applied even in the situation in which variation in a pure time delay (pure delay) $t_r$ is large.

Furthermore, when the variation of the time delay is large, the number of sub-filters should be designed to be large. The present disclosure is intended to provide an adaptive filter, an electronic device using the adaptive filter, and a method for operating the adaptive filter, which can manage a computational load so that the computational load is not increased above a certain level by allowing sub-filters to share the calculated values of calculation formula required for calculating filter coefficient values and by further limiting or gradually reducing the number of active sub-filters using a pruning method.

Technical Solution

An electronic device according to an embodiment of the present disclosure may include the speaker for outputting an audio signal corresponding to audio data, the microphone for collecting an input audio signal, and an audio processing unit for performing control of the speaker and the microphone, wherein the audio-processing unit may include an audio output unit for collecting audio data to be output, a sound source playback processing block for processing signal conversion of audio data, a sound source collection processing block for performing signal processing on an audio signal collected through the microphone, a speech recognizer for performing speech recognition on the collected audio signal, and an echo canceller for processing an echo in a signal which is output through the speaker and is input through the microphone after being subjected to a dispersion and reflection process, wherein the echo canceller includes an adaptive delay diversity filter having a plurality of sub-filters for, when using the signal played through the speaker as a reference signal of the adaptive filter and using the signal captured at the microphone as a target signal of the adaptive filter, processing variation in a time delay between the two signals.

Here, the plurality of sub-filters may be implemented as adaptive filters, respectively, which are designed to cover different partial time intervals in the entire time period of the impulse response that is desired to be estimated.

Here, the plurality of sub-filters may be configured such that time intervals covered by two adjacent sub-filters do not overlap each other, thus performing signal processing.

Alternatively, the plurality of sub-filters may be configured such that time intervals covered by two adjacent sub-filters at least partially overlap each other, thus performing signal processing.

Further, the plurality of sub-filters may select the output value of the sub-filter having the best output value from among output values of respective sub-filters as the output value of the echo canceller, while the sub-filters compete with each other for each time period.

Meanwhile, the echo canceller may be set such that, in order to reduce a computational load, the plurality of sub-filters shares the calculated values among sub-filters using a "time-delay relational expression," which are calculated through calculation formulas used for calculating filter coefficient values.

Furthermore, the echo canceller may be configured to gradually decrease the number of sub-filters that are in an active state by continuously performing a pruning operation of deactivating the sub-filter having the worst performance metric value, among the multiple sub-filters.

Alternatively, the echo canceller may be configured to perform a pruning operation of deactivating a sub-filter according to designated conditions until one active sub-filter or a predefined number of active sub-filters remains.

Alternatively, the echo canceller may be configured to perform a pruning operation of deactivating a sub-filter so as to limit the number of sub-filters that perform adaptation, among the multiple sub-filters.

Alternatively, the echo canceller may perform control such that one or more sub-filters showing a certain performance metric value or more, among the multiple sub-filters, remain in an active state.

Alternatively, the echo canceller may perform control such that the number of multiple sub-filters is the predefined number of sub-filters based on the computational performance of an electronic device.

An adaptive filter according to an embodiment of the present disclosure is an adaptive filter applied to an echo canceller for, when using a signal played through the speaker as a reference signal of the adaptive filter and using a signal captured at the microphone as a target signal of the adaptive filter, processing variation in a time delay between the two signals, and includes an adaptive delay diversity filter having a plurality of sub-filters for covering the variation in the time delay, wherein the plurality of sub-filters includes an operation of selecting the best output value from among output values of respective sub-filters as the output of the adaptive delay diversity filter while competing with each other, and the adaptive delay diversity filter is designed such that a pruning operation is performed for the plurality of sub-filters and a number of sub-filters less than or equal to the predefined number of sub-filters are activated, and one best sub-filter, among the sub-filters, estimates a portion corresponding to an acoustic path having a substantially meaningful value in an impulse response of an entire echo path, thus performing filtering.

A method for operating an adaptive delay diversity filter according to an embodiment of the present disclosure may include, in order to process variation in a time delay between a reference signal played through the speaker and a target signal captured at the microphone, allowing a plurality of sub-filters to select, as a final output value, the best output value from among output values of respective sub-filters while competing with each other, and may further include performing a pruning operation for the plurality of sub-filters for covering the variation in the time delay and allowing only a number of sub-filters less than or equal to the predefined number of sub-filters to be activated, and allowing one best sub-filter, among active sub-filters, to estimate a portion corresponding to an acoustic path having a substantially meaningful value in an impulse response of an entire echo path, thus performing filtering.

Advantageous Effects

In accordance with the apparatus of the present disclosure, the present disclosure may provide an echo canceller using an adaptive filter, which may perform echo cancellation while adjusting or minimizing a computational load together with the realization of excellent convergence characteristics even if variation in a time delay between two signals is large when a signal played through the speaker is used as a reference signal of the echo canceller and a signal captured at the microphone is used as a target signal of the echo canceller.

Further, in a general signal transmission environment as well as an audio environment where a transmit signal transmitted from a transmitting end is modified while passing through the transmission path and is then received as a received signal at a receiving end, an adaptive filter may be used to estimate the impulse response of a transmission path or to estimate the desired signal using the transmit signal as a reference signal and the reception signal as a target signal of the adaptive filter. In this case, the present disclosure may perform efficient estimation even if variation in a time delay between the two signals is large.

Various other effects of the present disclosure will be additionally described with reference to the following embodiments.

DETAILED DESCRIPTION

Figure 1:
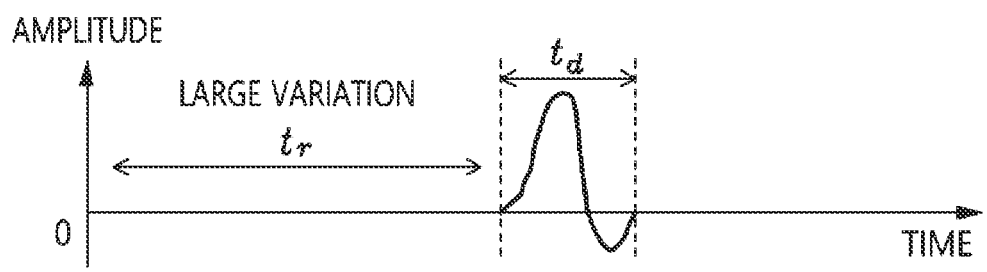
FIG. 1 is a diagram illustrating the normal form of the impulse response of a corresponding transmission path when a signal transmitted from a transmitting end of an electronic device moves through a transmission path and is then received at a receiving end.

In the following description, it should be noted that only parts required for understanding of embodiments of the present disclosure will be described, and explanation of other parts will be omitted so as to avoid making the gist of the present disclosure unclear.

It should be noted that the terms and words used in the specification and the claims, which will be described below, should not be construed as being limited to ordinary meanings or dictionary definitions, and an inventor can appropriately define the concepts of terms in order to best describe his or her invention. Meanwhile, the embodiments described in the present specification and the configurations illustrated in the drawings are merely preferable embodiments and do not exhaustively present the technical spirit of the present disclosure. Accordingly, it should be appreciated that there may be various equivalents and modifications that can replace the embodiments and the configurations at the time at which the present application is filed.

Hereinafter, embodiments of the present disclosure will be described in detail with reference to the accompanying drawings.

FIG. 1 is a diagram illustrating the normal form of the impulse response of a corresponding transmission path when a signal transmitted from a transmitting end of an electronic device moves through a transmission path and is then received at a receiving end.

In FIG. 1, $t_r$ indicates an interval during which the impulse response has a value of 0 in an initial stage, and is a factor, which simply causes only a time delay when the transmitted signal is received and which occurs due to, for example, a transfer process attributable to signal copying. $t_d$ is a factor, which causes signal modification as well as a time delay, and which occurs, for example, when a signal is moved in physical space, and is a principal portion of the impulse response.

The present disclosure relates to a method for efficiently estimating a system, which has an impulse response with large $t_r$ variation, through the use of an adaptive filter whenever an impulse response is measured. In particular, the present disclosure presents a method for yielding the same effect as that obtained when estimating the entire period of the impulse response by estimating a $t_d$ interval using a small sub-filter, instead of directly estimating the entire period of the impulse response.

Figure 2A:
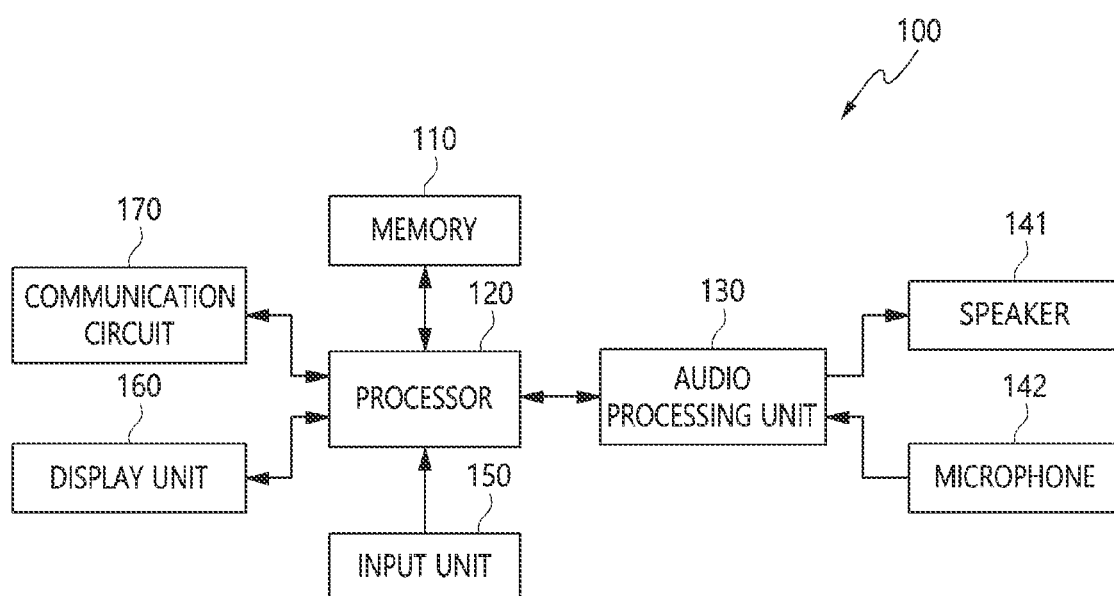
FIG. 2A is a diagram illustrating an example of the configuration of an electronic device according to an embodiment of the present disclosure.
Figure 2B:
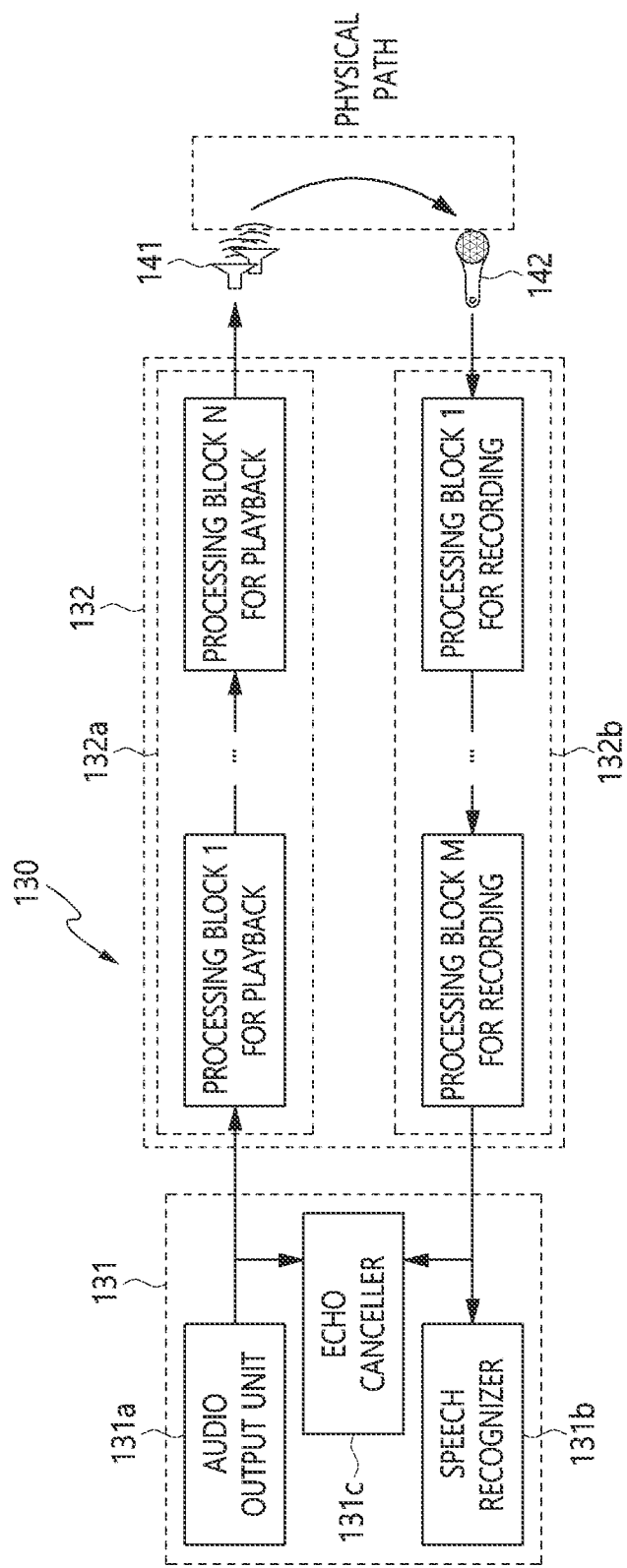
FIG. 2B is a diagram illustrating an example of configuration of a portion of an electronic device including an audio-processing unit according to an embodiment of the present disclosure.

FIG. 2A illustrates an example of the configuration of an electronic device according to an embodiment of the present disclosure, and FIG. 2B is a diagram illustrating an example of configuration of a portion of an electronic device including an audio-processing unit according to an embodiment of the present disclosure.

Referring to FIG. 2A, an electronic device 100 according to an embodiment of the present disclosure may include memory 110, a processor 120, an audio-processing unit 130, a speaker 141, a microphone 142, a display unit 160, a communication circuit 170, and an input unit 150. Additionally, the electronic device 100 may further include a sensor module (e.g., a camera, an acceleration sensor, a position information collection sensor, or the like) which can collect various sensor signals.

The memory 110 may store various programs and various types of data related to the operation of the electronic device. For example, the memory 110 may store an operating system related to the operation of the electronic device 100, applications related to various user functions provided based on the electronic device 100, and various types of data related to execution of the applications. In an example, the memory 110 may store a music playback application related to music playback and a speech (voice) recognition application related to speech recognition. Further, the memory 110 may store applications for supporting various functions, such as a recording function, a video playback function, and a remote control function for an external electronic device. The memory 110 may store an echo canceller including an adaptive filter according to an embodiment of the present disclosure, and may provide the echo canceller to the audio-processing unit 130 under the control of the processor 120. Alternatively, the echo canceller may be mounted in the audio-processing unit 130 in an embedded manner. Alternatively, the echo canceller may be implemented as at least one hardware processor or at least one software module.

The processor 120 may perform various types of signal processing related to the operation of the electronic device 100, e.g., transfer and processing of audio data. The processor 120 may be implemented using multiple sub-processors, or may be implemented to allow one processor to process multiple functions. In an example, the audio-processing unit 130 may be integrated into the processor 120. Here, the audio-processing unit 130 may be understood to be a component of the processor 120. The processor 120 may be supplied with power from a battery included in the electronic device 100 or an external power source connected thereto, and may perform various user functions using the corresponding power. For example, the processor 120 may perform various types of processing, such as playing music based on user input that is received through the input unit 150 or preset scheduling information, searching for an external electronic device and establishing a communication channel therewith, playing video, or accessing a server and receiving and outputting content provided by the server. In the present disclosure, the processor 120 may manage the application of an echo cancellation function to audio data produced during a specific application execution procedure by controlling the audio-processing unit 130.

The speaker 141 may be connected to the audio-processing unit 130, and may convert received audio data into an audio signal and output the audio signal, under the control of the audio-processing unit 130.

The microphone 142 may be connected to the audio-processing unit 130, and may be activated under the control of the audio-processing unit 130, after which the microphone 142 may collect an external audio signal, convert the external audio signal into audio data, and transfer the audio data to the audio-processing unit 130.

The display unit 160 may output various screens related to the operation of the electronic device 100. For example, the display unit 160 may output various screens, such as a screen related to music playback, a screen related to a speech recognition function, and a video playback screen. As an example, the display unit 160 may include a touch function, and in which case the display unit 160 may be operated as a component of the input unit.

The communication circuit 170 may support at least one communication function of the electronic device 100. For example, the communication circuit 170 may establish a base station communication channel in relation to a connection to a server. Alternatively, the communication circuit 170 may establish a short-range communication channel with an external electronic device. In relation to this, the communication circuit 170 may include at least one of a network communication module and a short-range communication module. As an example, the communication circuit 170 may receive audio data (e.g., sound source information) provided by a server (e.g., a sound source provision server) under the control of the processor 120, and may output the audio data to the speaker 141 through the audio-processing unit 130. Alternatively, the communication circuit 170 may receive audio data from an additional electronic device connected through the short-range communication channel and transfer the audio data to the audio-processing unit 130, or may transmit played audio data to the additional electronic device under the control of the processor 120. Further, the communication circuit 170 may also transmit speech data required in order for the server to perform speech recognition to the server, under the control of the processor 120. Furthermore, the communication circuit 170 may transmit the results of speech recognition to the server or to an external electronic device under the control of the processor 120.

The input unit 150 may support an input function of the electronic device 100. For example, the input unit 150 may include a keypad, a key button or the like. Alternatively, the electronic device 100 may include the configuration of the microphone 142, which is capable of performing a voice command function, as the input unit 150. A user may request the execution or termination of various user functions provided by the electronic device 100 through the input unit 150. For example, the input unit 150 may collect an input signal for executing a music playback function, an input signal for playback control during music playback, an input signal for establishing or releasing a connection to the server, a voice command input signal related to a speech recognition function, etc., and may transfer the collected input signals to the processor 120.

The audio-processing unit 130 may support the execution of applications related to audio-data processing, and may control at least one of the speaker 141 and the microphone 142 to output audio data or collect an audio signal during the application execution support procedure. The audio-processing unit 130 may perform function processing depending on execution of a specific application under the control of the processor 120, or may be authorized by the processor 120 to control the execution and function processing of a specific application. As described above, the audio-processing unit 130 may be implemented as a partial component of the processor 120, or may be implemented as a component independent of the processor 120 to communicate with the processor 120, thus performing function processing depending on execution of a specific application. Due to this implementation scheme, the audio-processing unit 130 may be regarded as a single processor. The audio-processing unit 130 may process the functions to be performed depending on the type of application that is requested to be executed or execution of the application, and various tasks or various tasks related to processing of audio data by applications currently being executed. For example, the audio-processing unit 130 may perform control such that the speaker 141 is activated in response to a request received from a music playback application and such that various types of audio processing are performed on audio data to be played, and thereafter processed audio data is output through the speaker 141.

Further, when a recording function or an application for controlling an external electronic device is executed, the audio-processing unit 130 may support audio processing such that the microphone 142 is activated to collect user speech information and various types of audio processing are performed on audio signals collected through the microphone 142, after which the processed audio signals are stored in the memory 110 or are transmitted to an external electronic device through the communication circuit 170.

In particular, when audio signals are collected through the microphone 142 during an audio data output process, the audio-processing unit 130 according to the present disclosure may perform echo cancellation on the collected audio signals by performing echo cancellation using an adaptive delay diversity filter, and thereafter may perform speech recognition on the corresponding audio signals. For example, the adaptive delay diversity filter may be configured such that at least a portion thereof is implemented in the form of hardware or at least a portion thereof is implemented in the form of a software module. When at least a portion of the adaptive delay diversity filter is implemented as a software module, the present disclosure may include memory, which stores the software module forming at least the portion of the adaptive delay diversity filter and a hardware processor component, which accesses the memory and executes the operation of the adaptive delay diversity filter.

Such a speech recognition process may be performed using, for example, a speech recognition database (DB) stored in the memory 110 or a speech recognition DB stored in the server, and may be configured to process various user functions based on the results of speech recognition. Referring to FIG. 2B, such an audio-processing unit 130 may include an application block 131 and an audio input/output processing block 132.

The application block 131 may include an audio output unit 131a, a speech recognizer 131b, and an echo canceller 131c.

The audio output unit 131a may collect audio data according to execution of a music playback application stored in the memory 110, and may transfer the collected audio data to a sound source playback processing block 132a. Alternatively, the audio output unit 131a may transfer audio data received from the outside through the communication circuit 170 to the sound source playback processing block 132a. The audio output unit 131a may be activated according to execution of the sound source application, and may perform processing of the collected audio data.

The speech recognizer 131b may be activated according to execution of a specific application, and may control the supply of power to the microphone 142. For example, when an application supporting a speech recognition function (e.g., a music playback application, a navigation program or the like) is executed, the speech recognizer 131b may be activated, and may control the supply of power to the microphone 142 to collect audio signals. The speech recognizer 131b may analyze audio data transferred from a sound source collection processing block 132b, and may transfer the results of analysis of the audio data to the processor 120. Alternatively, the speech recognizer 131b may control the execution of a user function (e.g., playback control for a music playback program, or the like) corresponding to the results of analysis of the audio data.

The echo canceller 131c may collect first audio data transferred from the audio output unit 131a to the sound source playback processing block 132a and second audio data transferred from the sound source collection processing block 132b to the speech recognizer 131b. The echo canceller 131c may estimate and subtract an echo contained in the second audio data using the collected first audio data, and may provide the result of the estimation and subtraction to the speech recognizer 131b. During this process, the echo canceller 131c may perform filtering by operating an adaptive filter composed of a plurality of sub-filters. During this process, the echo canceller 131c may set a value corresponding to the acoustic path length (e.g., a physical distance or an acoustic distance between the speaker and the microphone) of the electronic device 100 to the filter length value of a sub-filter, and may configure the adaptive delay diversity filter using a plurality of such sub-filters. Through the configuration of the adaptive delay diversity filter using the plurality of sub-filters, whenever new input is received, respective sub-filters may generate output values through filtering, and the best output value among the output values of the plurality of sub-filters may be selected as a final output value.

Also, the echo canceller 131c may allow respective sub-filters to share calculation values (e.g., an inverse matrix of a correlation matrix in the case of a Wiener filter) used to compute filter coefficients of the adaptive filter, thus reducing the computational load required by respective sub-filters to compute coefficients. The echo canceller 131c may finally select one sub-filter by gradually reducing the number of sub-filters that are in an active state using a pruning method, thus reducing a computational load.

The audio input/output processing block 132 may include at least one sound source playback processing block 132a and at least one sound source collection processing block 132b. The sound source playback processing block 132a may be disposed between the speaker 141 and the audio output unit 131a. The sound source playback processing block 132a may include one or more blocks for providing various acoustic effects required for sound source playback. The sound source collection processing block 132b may be disposed between the microphone 142 and the speech recognizer 131b.

Figure 3A:
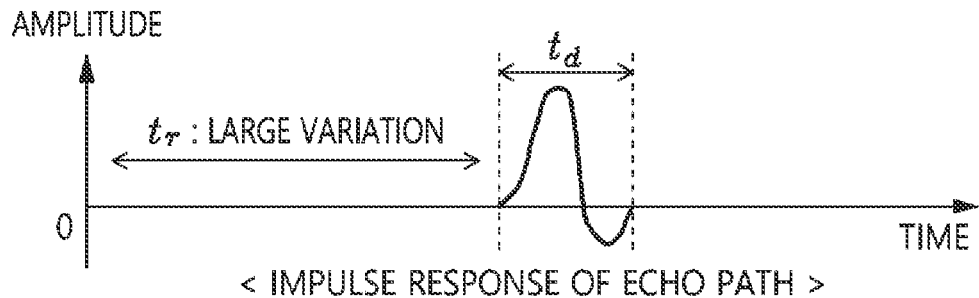
FIG. 3A is a diagram illustrating the impulse response of an echo path for an audio signal and a single large filter for covering the impulse response.

FIG. 3A is a diagram illustrating the impulse response of an echo path for an audio signal and a single large filter for covering the impulse response.

The impulse response of the echo path illustrated in FIG. 3A shows the change occurring in a process in which a signal output through the speaker 141 flows in the microphone 142. Here, an acoustic time delay $t_d$, may be a time delay occurring due to dispersion and reflection of sound produced in a pure acoustic path, and a non-acoustic time delay $t_r$ may be a time delay occurring in a non-acoustic path, may be mainly caused in a software processing procedure (e.g., copying/transfer of transmission data), and may also occur when an audio signal is moved in the form of a digital signal through a hardware path. Large variation in the non-acoustic time delay $t_r$ may appear when the electronic device changes or when an audio connection path changes, and thus there is a need to estimate an echo using an adaptive filter having a large filter length. That is, in an audio signal environment, when an echo path is composed of the non-acoustic time delay $t_r$ and the acoustic time delay $t_d$, and variation in $t_r$ at this time is large, a long filter may be used to estimate an echo. In this case, due to the excessively large filter length, the time required to estimate an echo signal is longer, and an error is also increased. In order to solve this problem, the adaptive delay diversity filter according to the present disclosure may be used.

When the signal transmission environment is regarded as being extended to a general signal transmission environment, without being limited to an audio environment, the impulse response of a transmission path from the transmission of a signal from a transmitting end to the reception of the signal at a receiving end in the environment may be similarly generalized, as illustrated in FIG. 3A, wherein the time intervals $t_r$ and $t_d$ at this time may be changeably referred to as general terms, such as a pure time delay $t_r$ and a modulation time delay $t_d$, respectively. The term "modulation" used here is introduced to mean an operation of causing a modification in the waveform of a signal, and is used to temporarily designate the interval $t_d$. Further, in the case of the pure time delay $t_r$, only a time delay is simply caused, without modification of a transmitted signal, and an example of occurrence of the pure delay may be a process for transferring a signal between adjacent software blocks or a process for transmitting a signal in the form of a digital signal between hardware blocks. In the overall impulse response, a portion corresponding to the pure delay interval $t_r$ ideally has a value of 0. The modulation time delay $t_d$ may occur in a transmission interval during which the waveform of a signal is modified, and may occur, for example, in an interval during which a signal is transmitted in the form of an analog signal, or may also occur even in the case where a signal modification procedure is included in a software block. When the impulse response of an arbitrary system is divided into the interval of the pure time delay $t_r$ and the interval of the modulation time delay $t_d$ in this way, the adaptive delay diversity filter according to the present disclosure may be used to effectively estimate the impulse response or a signal modified in the transmission procedure when variation in the pure time delay $t_r$ is large.

Figure 3B:
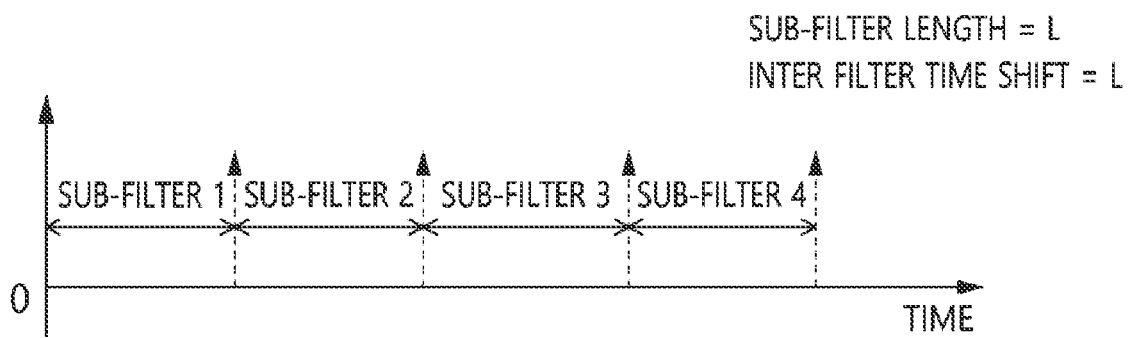
FIG. 3B illustrates an example of an array structure of sub-filters of an adaptive delay diversity filter according to an embodiment of the present disclosure, wherein respective sub-filters forming the adaptive delay diversity filter are arranged such that respective time areas covered thereby do not overlap each other.

FIG. 3B illustrates an example of an array structure of sub-filters of an adaptive delay diversity filter according to an embodiment of the present disclosure, wherein respective sub-filters forming the adaptive delay diversity filter are arranged such that respective time areas covered thereby do not overlap each other.

Referring to FIG. 3B, in consideration of both a non-acoustic time delay $t_r$ and an acoustic time delay $t_d$, the echo canceller 131c may use multiple sub-filters. For example, as illustrated in the drawing, four sub-filters (sub-filter 1, sub-filter 2, sub-filter 3, and sub-filter 4) may be used. When the respective sub-filters (sub-filter 1, sub-filter 2, sub-filter 3, and sub-filter 4) cover different time intervals of an impulse response, the time difference or time shift D between the time intervals covered by two adjacent sub-filters may be designed to be the same as the filter length L of each sub-filter. Here, the filter length L of each sub-filter may be set in association with the acoustic time delay $t_d$. The acoustic time delay $t_d$ may be collected through experimental results or statistical results depending on the physical distance between the speaker 141 and the microphone 142. The sub-filters (sub-filter 1, sub-filter 2, sub-filter 3, and sub-filter 4) may be disposed to be directly successive to each other so that time intervals covered by respective sub-filters do not overlap those of adjacent sub-filters (e.g., so that the time shift between respective sub-filters is D=L). For example, the second sub-filter (sub-filter 2) may be disposed adjacent to the first sub-filter (sub-filter 1), the third sub-filter (sub-filter 3) may be disposed adjacent to the second sub-filter (sub-filter 2), and the fourth sub-filter (sub-filter 4) may be disposed adjacent to the third sub-filter (sub-filter 3). The total length of the first to fourth sub-filters (sub-filter 1, sub-filter 2, sub-filter 3, and sub-filter 4) may be set to be longer than a length corresponding to the sum of the non-acoustic time delay $t_r$ and the acoustic time delay $t_d$. Alternatively, the length corresponding to the sum of the non-acoustic time delay $t_r$ and the acoustic time delay $t_d$ may be used to determine the number of sub-filters.

Figure 3C:
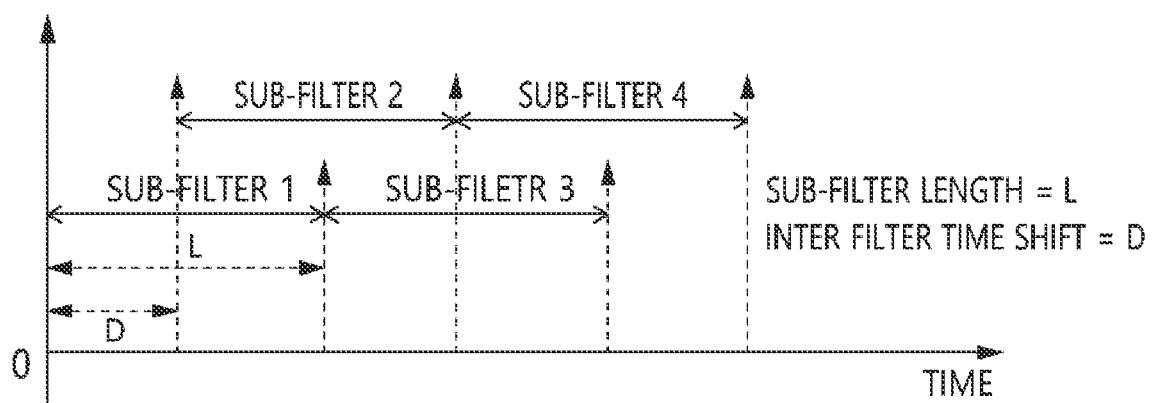
FIG. 3C illustrates another example of an array structure of sub-filters of an adaptive delay diversity filter according to an embodiment of the present disclosure, wherein respective sub-filters forming the adaptive delay diversity filter are arranged such that respective time areas covered thereby partially overlap each other.

FIG. 3C is a diagram illustrating another example of an array structure of sub-filters of an adaptive delay diversity filter according to an embodiment of the present disclosure, wherein the lengths of respective sub-filters forming the adaptive delay diversity filter are L and are identical to each other, and wherein time areas covered by respective sub-filters are arranged at regular intervals (e.g., D) and such that time areas covered by two adjacent sub-filters partially overlap each other.

Referring to FIG. 3C, in order to cope with the non-acoustic time delay $t_r$ and the acoustic time delay $t_d$ together, shown in FIG. 3A, the echo canceller 131c of the present disclosure may use multiple sub-filters and operate the multiple sub-filters so that time areas covered by respective sub-filters are arranged to partially overlap each other. For example, as illustrated in the drawing, when four sub-filters (sub-filter 1, sub-filter 2, sub-filter 3, and sub-filter 4) cover different time intervals of the impulse response, the sub-filters may be designed and operated such that the time difference or time shift between time intervals covered by two adjacent sub-filters is identical to D for all sub-filters and D has a value falling within a range of 0<D<L. Here, the filter lengths L of respective sub-filters may be set in association with the value of the acoustic time delay $t_d$. For example, the echo canceller 131c is intended to estimate an interval corresponding to the acoustic time delay $t_d$, in the entire echo path, using the first to fourth sub-filters (sub-filter 1, sub-filter 2, sub-filter 3, and sub-filter 4), and respective sub-filters may be arranged such that time intervals covered by each sub-filter and an adjacent sub-filter partially overlap each other. As described above, the echo canceller 131c may support the performance of more robust filtering by arranging the two adjacent sub-filters so that the time intervals covered thereby partially overlap each other.

Here, the filter length formed by all of the sub-filters may be set to a length equal to or greater than the length of the echo path (e.g., the sum of the non-acoustic time delay $t_r$ and the acoustic time delay $t_d$).

FIGS. 3B and 3C illustrate special examples of the structure of the adaptive delay diversity filter according to an embodiment of the present disclosure, and show an example in which filter lengths of respective sub-filters are identical to each other and distances between time intervals covered by two adjacent sub-filters are uniform. Unlike this example, depending on the circumstances, multiple sub-filters may cover different time intervals of the impulse response, but they may be configured such that the spaces between the distances between time intervals covered by adjacent sub-filters are not uniform, or such that the filter lengths of the sub-filters are different from each other.

Meanwhile, respective sub-filters forming the adaptive delay diversity filter are implemented in the form of an adaptive filter, may adopt and use an arbitrary adaptive filter algorithm, and may perform adaptation independently of each other.

Figure 3D:
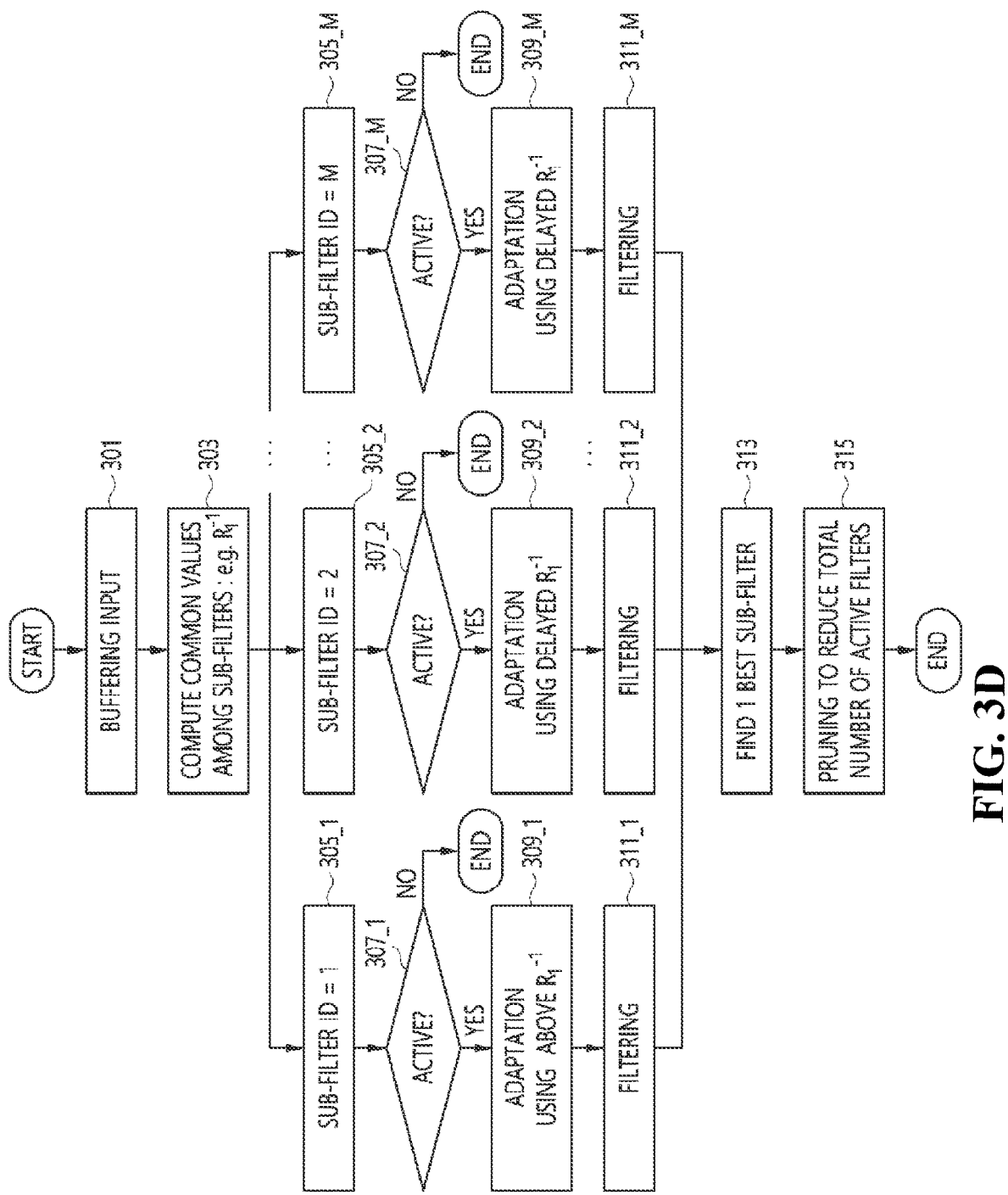
FIG. 3D is a diagram illustrating an example of an echo cancellation method according to an embodiment of the present disclosure.

FIG. 3D is a diagram illustrating an example of an echo cancellation method according to an embodiment of the present disclosure, and is a diagram in which respective sub-filters are assumed to use a Wiener filter as an adaptive filter algorithm.

Referring to FIG. 3D, the echo canceller 131c (or the processor 120 or the audio-processing unit 130) may process input buffering at step 301. For example, at step 301, the echo canceller 131c may collect a reference signal played through the speaker and collect a target signal input into the microphone 142, and may then store the collected signals in a buffer.

At step 303, the echo canceller 131c computes the inverse matrix of a correlation matrix for the first sub-filter. This inverse matrix is used to compute filter coefficients through adaptation of the first sub-filter at step 309_1. Delayed values of the inverse matrix are used for adaptation of the second sub-filter, the third sub-filter, . . . , at steps 309_2, . . . , 309_M.

Next, the echo canceller 131c may perform an adaptation and filtering procedure on respective sub-filters. For example, the echo canceller 131c may allocate an ID for computation of the first sub-filter (e.g., sub-filter ID=1) at step 305_1, and may check whether the first sub-filter is in an active state may be checked at step 307_1. If the first sub-filter is in an inactive state, the echo canceller 131c may stop computation for the first sub-filter. If the first sub-filter is in an active state, the echo canceller 131c computes filter coefficients through adaptation using the inverse matrix, obtained at step 303, at step 309_1, and performs filtering at step 311_1.

The echo canceller 131c may perform the above-described ID allocation, checking of activation or deactivation, application of the correlation matrix, and filtering for other sub-filters in the same manner. In this operation, the echo canceller 131c may simultaneously perform computations for respective sub-filters in parallel. For example, the echo canceller 131c may perform allocation of an ID to the second sub-filter (e.g., sub-filter=2, at step 305_2), check activation or deactivation of the second sub-filter (e.g., active? at step 307_2), perform adaptation using the delayed values of the inverse matrix of the correlation matrix directly computed for the first sub-filter (at step 309_2) and perform filtering (at step 311_2) while performing processing of computation for the first sub-filter. Furthermore, the echo canceller 131c may perform allocation of an ID to an M-th sub-filter (e.g., sub-filter=M, at step 305_M), check activation or deactivation of the M-th sub-filter (e.g., active? at step 307_M), perform adaptation using the delayed values of the inverse matrix of the correlation matrix (at step 309_M) and perform filtering (at step 311_M) so as to perform computation for the M-th sub-filter.

Next, the echo canceller 131c may select the best filter at step 313. For example, the echo canceller 131c may select the sub-filter having the best result by comparing the results of filtering by the first to M-th sub-filters with each other.

Figure 3E:
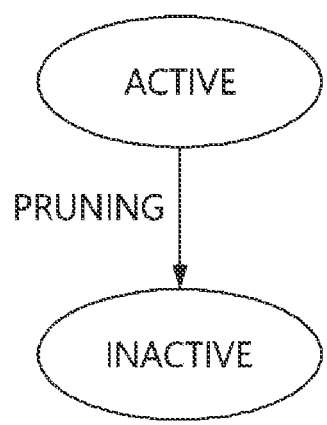
FIG. 3E is a diagram for explaining a change between the activation and deactivation of sub-filters depending on a pruning operation according to an embodiment of the present disclosure.

Next, the echo canceller 131c may reduce a computational load related to the operation of sub-filters by performing pruning for reducing the total number of active sub-filters at step 315. With using the pruning function, as illustrated in FIG. 3E, the specific sub-filter may transition from the active state to an inactive state. The sub-filter transitioning to the inactive state may be excluded from all subsequent processing procedures.

As described above, respective sub-filters of the adaptive delay diversity filter are implemented and operated as adaptive filters, and the adaptive delay diversity filter selects the output of the sub-filter having the best result as final output while the sub-filters compete with each other whenever input is received for each time period. At this time, the inverse matrix of the correlation matrix used to obtain filter coefficients may be computed only for the first sub-filter, rather than for all sub-filters, and values obtained by delaying the values computed for the first sub-filter may be used by second and subsequent sub-filters. This is intended to exemplify the case where a Wiener filter is used, and computations may be reduced using a time delay relational expression such as that shown in Equation 30 or Equation 31, even when other algorithms are used.

Henceforth, equations will be introduced to help understand the detailed structure of the adaptive delay diversity filter, wherein, in equations, symbols written in lowercase italics denote scalars, symbols written in bold lowercase italics denote vectors, and symbols written in bold uppercase italics denote matrixes. In the following equations, j is used as a sub-filter number, wherein j=1, 2, . . . , M may be given. M is the number of sub-filters present in the adaptive delay diversity filter. In the following equations, n is a sample number in the time domain, and m is the number of a frame used in an algorithm for calculating filter coefficients by collecting samples in frame (or block) units, or in an algorithm operating in the frequency domain.

Considering an echo canceller operating in an audio signal environment when a reference signal of the adaptive delay diversity filter is denoted by x(n) and a target signal thereof is indicated by y(n), x(n) may be a signal output from the speaker, and y(n) may be a signal input to the microphone 142, wherein y(n) may contain an echo, noise, user speech, or the like. Considering a normal signal transmission environment, x(n) may be a transmit signal that is transmitted from a transmitting end, and y(n) may be a received signal at a receiving end, and y(n) may contain a modified signal of x(n), noise, an external interference signal, or the like.

When the reference signal of each sub-filter included in the adaptive delay diversity filter is indicated by $x_j(n)$ (where j=1, . . . , M), $x_j(n)$ may have the form of a time-delayed signal of x(n), and may be represented by the following Equation 1.

$$x_j(n)=x(n-D_j), j=1,\ldots,M \quad \text{[Equation 1]}$$

Here, the time delay $D_j$ is an integer satisfying $0 \leq D_1 < D_2 < \ldots < D_M$.

When the impulse response of the echo path is estimated using the adaptive delay diversity filter, respective sub-filters use delayed signals $x_j(n)$, obtained by applying different time delay values $D_j$ to x(n), as shown in Equation 1, as respective reference signals, and thus the respective sub-filters may be arranged to cover different partial time areas of the impulse response.

If the reference signal vector of the j-th sub-filter is noted by $x_j(n)$ assuming that the filter length of each sub-filter included in the adaptive delay diversity filter is $L_j$ (where j=1, . . . , M), $x_j(n)$ may be represented by the following Equation 2.

$$x_j(n)=[x_j(n),x_j(n-1), \ldots ,x_j(n-L_j+1)]^T \qquad \text{[Equation 2]}$$

For example, in the case where an adaptive filter algorithm operating in the time domain is used, an echo estimate signal or a target estimate signal $\hat{y}_j(n)$ and an error signal $e_j(n)$ of the j-th sub-filter yjn may be computed using the following Equation 3.

$$e_j(n)=y(n)-\hat{y}_j(n)$$

$$\hat{y}_j(n)=\Sigma_{i=0}^{L_j-1} w_{j,i} x_j(n-i) = w_j^T x_j(n) \qquad \text{[Equation 3]}$$

$w_{j,i}$ denotes an i-th value among filter coefficients of the j-th sub-filter, and the filter coefficient vector $w_j$ of the j-th sub-filter may be defined by the following Equation 4.

$$w_j=[w_{j,0} w_{j,1} \ldots w_{j,L_j-1}]^T, j=1, \ldots ,M \qquad \text{[Equation 4]}$$

After the target estimate signal $\hat{y}_j(n)$ and the error signal $e_j(n)$ of each sub-filter are computed, the target estimate signal $\hat{y}(n)$ and the error signal $e(n)$ of the adaptive delay diversity filter may be computed using the following Equation (5).

$$\hat{y}(n)=\text{best}\{\hat{y}_1(n), \ldots ,\hat{y}_M(n)\}$$

$$e(n)=\text{best}\{e_1(n), \ldots ,e_M(n)\} \qquad \text{[Equation 5]}$$

As shown in Equation 5, the best value among the target estimate signals $\{\hat{y}_1(n), \ldots ,\hat{y}_M(n)\}$ of the M sub-filters may be selected as the target estimate signal $\hat{y}(n)$ of the adaptive delay diversity filter, and the best value among the error signals $\{e_1(n), \ldots ,e_M(n)\}$ of the M sub-filters may be selected as the error signal $e(n)$ of the adaptive delay diversity filter. Here, the object used as a criterion for selecting the best value is a performance metric $p_j(n)$ (where j=1, . . . , M). The performance metric $p_j(n)$ is a value indicating the estimation performance of each sub-filter, and may be designed in various forms. Each sub-filter may perform adaptation using every new input signal, and may then compute the performance metric $p_j(n)$, wherein the input signal $y(n)$ and the target estimate signal $\hat{y}_j(n)$ or the error signal $e_j(n)$ of each sub-filter may be used to compute $p_j(n)$. The $p_j(n)$ may be used as a criterion for selecting the best sub-filter from among multiple sub-filters and the best output. In Equation 5, best{•} means the value obtained from the sub-filter having the best performance metric value among the performance metric values $\{p_1(n), \ldots , p_M(n)\}$ of the respective sub-filters. Here, the meaning of "best" indicates the case where the performance metric value is an extreme value (minimum value or maximum value), wherein the "best" performance metric value may mean the maximum performance metric value or the minimum performance metric value according to the designed form of the performance metric. That is, when the performance metric is designed, it may be designed such that, as the performance metric value is larger, the estimation performance of the corresponding sub-filter is judged to be better, or such that, as the performance metric value is smaller, the estimation performance of the corresponding sub-filter is judged to be better. For example, when the performance metric is designed as shown in the following Equation 6, the input signals $y(n)$ are identical for all sub-filters, and thus it may be considered that the performance of the corresponding sub-filter is better as the squared value of the error signal, that is, $|e_j(n)|^2$, is smaller. Therefore, the sub-filter having the lowest performance metric value, among respective performance metric values computed for multiple sub-filters, may be judged to have better estimation performance than other sub-filters.

$$p_j(n) = \frac{|e_j(n)|^2}{|y(n)|^2}, j = 1, \ldots , M \qquad \text{[Equation 6]}$$

In Equation 6, $p_j(n)$ may be obtained by normalizing the power $|e_j(n)|^2$ of the error signal to the power $|y(n)|^2$ of the input signal.

Meanwhile, when the performance metric is designed, as shown in Equation 7, a sub-filter having the highest performance metric value may be judged to have better estimation performance than other sub-filters.

$$p_j(n) = 1 - \frac{|e_j(n)|^2}{|y(n)|^2}, j = 1, \ldots , M \qquad \text{[Equation 7]}$$

The performance metric may be designed in various modified forms in addition to the previous two examples, and may be designed to use the average value of the current value and past values, as shown in the following Equation 8 or Equation 9.

$$p_j(n) = E\left\{\frac{|e_j(n)|^2}{|y(n)|^2}\right\}, 1, \ldots , M \qquad \text{[Equation 8]}$$

$$p_j(n) = E\left\{1 - \frac{|e_j(n)|^2}{|y(n)|^2}\right\}, 1, \ldots , M \qquad \text{[Equation 9]}$$

In Equation 8 or Equation 9, E{.} may specify expectation, and may be the average value of values in certain time intervals.

When the equation for the performance metric is defined by Equation 6 or Equation 8, the best sub-filter ID, i.e., best_sub_filter_id and the worst sub-filter ID, i.e., worst_sub_filter_id, are given as follows.

$$\text{best\_sub\_filter\_id} = \underset{j}{\arg\min}\{p_j(n)\}, j = 1, \ldots , M \qquad \text{[Equation 10]}$$

$$\text{worst\_sub\_filter\_id} = \underset{j}{\arg\max}\{p_j(n)\}, j = 1, \ldots , M$$

In Equation 10, best_sub_filter_id is the ID of the sub-filter corresponding to $p_j(n)$, which is the minimum value among values $\{p_1(n), \ldots , p_M(n)\}$, and worst_sub_filter_id may be the ID of the sub-filter corresponding to $p_j(n)$, which is the maximum value $p_j(n)$ among the values $\{p_1(n), \ldots , p_M(n)\}$.

When a performance metric equation is defined by Equation 7 or Equation 9, the best sub-filter ID, that is, best_sub_filter_id, and the worst sub-filter ID that is, worst_sub_filter_id, are given as follows.

$$\text{best\_sub\_filter\_id} = \underset{j}{\arg\max}\{p_j(n)\}, j = 1, \ldots , M \qquad \text{[Equation 11]}$$

$$\text{worst\_sub\_filter\_id} = \underset{j}{\arg\min}\{p_j(n)\}, j = 1, \ldots , M$$

In Equation 11, best_sub_filter_id is the ID of the sub-filter corresponding to $p_j(n)$, which is the maximum value among the values $\{p_1(n), \ldots, p_M(n)\}$, and worst_sub_filter_id is the ID of the sub-filter corresponding to $p_j(n)$, which is the minimum value among the values $\{p_1(n), \ldots, p_M(n)\}$.

Since the performance metric value may be computed either for each sample or once for each interval including several samples, it will be abbreviated to $p_j$ after a time factor n is omitted, for convenience of description.

After best_sub_filter_id has been detected from Equation 10 or Equation 11, the target estimate signal and the error signal of the best sub-filter best_sub_filter_id are selected as the target estimate signal $\hat{y}(n)$ and the error signal $e(n)$ of the adaptive delay diversity filter. The following Equation 12 is an equation representing this meaning.

$$\hat{y}(n) = \text{best}\{\hat{y}_1(n), \ldots, \hat{y}_M(n)\} = \hat{y}_{best\_sub\_filter\_id}(n)$$

$$e(n) = \text{best}\{e_1(n), \ldots, e_M(n)\} = e_{best\_sub\_filter\_id}(n) \quad \text{[Equation 12]}$$

Figure 4:
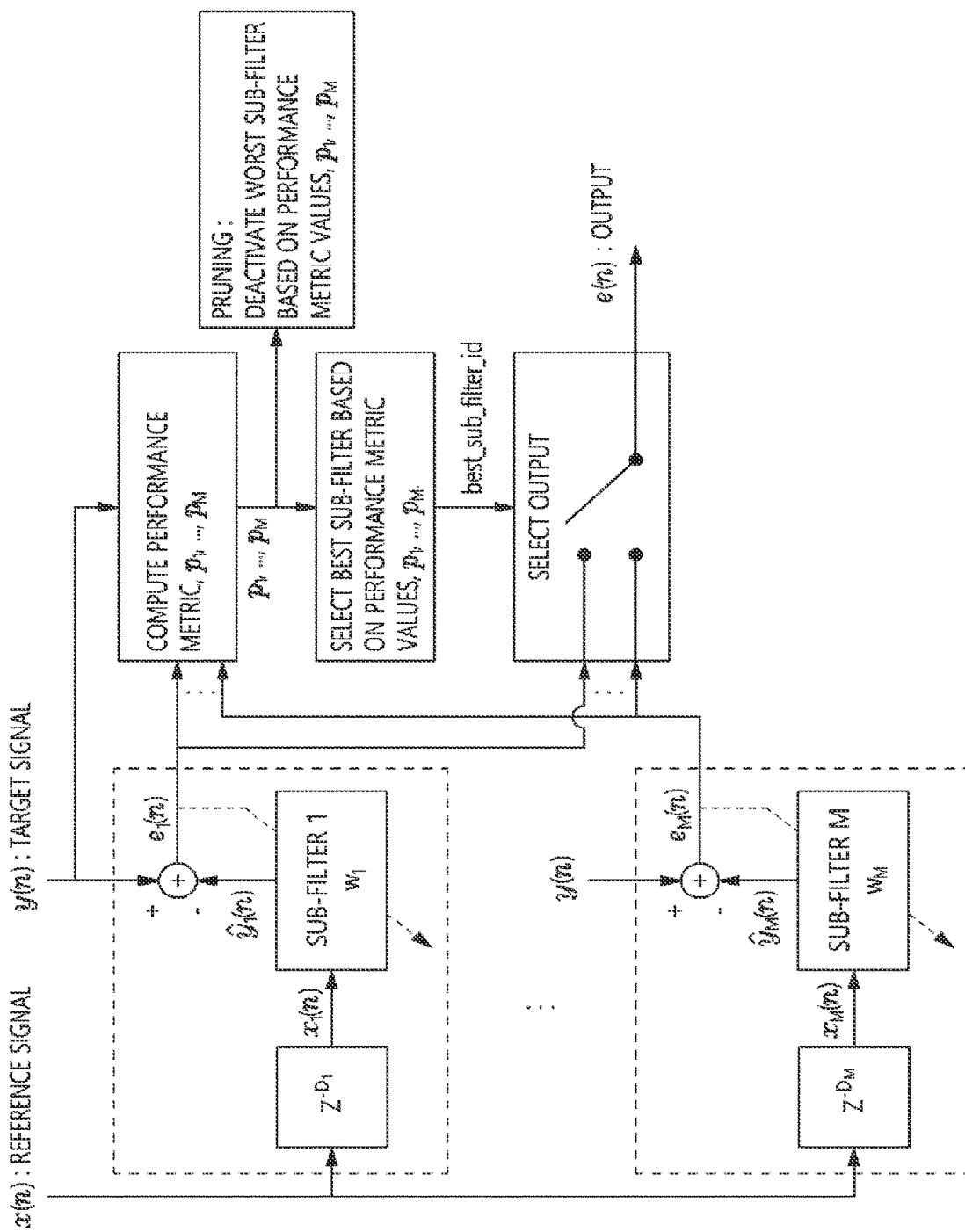
FIG. 4 is a diagram for explaining the structure and output selection of an adaptive delay diversity filter according to an embodiment of the present disclosure.

FIG. 4 is a diagram for explaining the structure and output selection of an adaptive delay diversity filter according to an embodiment of the present disclosure.

The echo canceller 131c may be implemented using the adaptive delay diversity filter, wherein, in the situation in which the adaptive delay diversity filter is operated, filter coefficients of all sub-filters are updated for each time period, after which the output of the sub-filter (e.g., the best filter or best sub-filter) having the best estimation performance among the sub-filters may be selected as the output of the adaptive delay diversity filter.

Referring to FIG. 4, the adaptive delay diversity filter used in the echo canceller 131c may include M sub-filters, each of which is implemented as an adaptive filter. In order to obtain the reference signal $x_j(n)$ (where $j=1, \ldots, M$) of each sub-filter, an operation of delaying $x(n)$ is performed, as shown in Equation 1, and is illustrated as being $z^{-D_1}, \ldots, z^{-D_M}$ in the drawing. The filter coefficient vector $w_j$ of each sub-filter is a value that causes $E\{|e_j(n)|^2\}$ to be minimized, and that can be obtained independently between respective sub-filters and can be obtained in the same manner as that used in a normal adaptive filter. Also, an adaptive filter algorithm adopted by each sub-filter is not limited to a specific algorithm.

Each sub-filter may generate the echo estimate signal $\hat{y}_j(n)$ by filtering the reference signal $x_j(n)$, as shown in Equation 3, and may generate the error signal $e_j(n)$ of each sub-filter by subtracting the estimate signal $\hat{y}_j(n)$ from the microphone input signal $y(n)$.

When the error signals $e_j(n)$ (where $j=1, \ldots, M$) of respective sub-filters are obtained, the echo canceller 131c may obtain the performance metric values $p_j(n)$ (where $j=1, \ldots, M$) of respective sub-filters using $e_j(n)$ and the input signal $y(n)$, select the ID of the sub-filter corresponding to the maximum value (or minimum value), among the $p_j(n)$ values of the multiple sub-filters, as the best filter ID best_sub_filter_id, and thereafter determine the output value $e_{j=best\_sub\_filter\_id}(n)$ of the selected sub-filter to be the output value $e(n)$ of the adaptive delay diversity filter. The echo canceller may perform a pruning operation of deactivating a sub-filter having a relatively worse performance metric value, among the multiple sub-filters, so as to reduce a computational load.

In the adaptive delay diversity filter, whenever a new input is received, the multiple sub-filters generate outputs through filtering, and the best output is selected from among the outputs and is used as the output of the adaptive delay diversity filter. In this way, from the concept in which the best output is selected as the final filter output from among the outputs of respective sub-filters while respective sub-filters cover different time delay intervals of an echo path, the term "adaptive delay diversity filter" has been adopted.

As described above, the adaptive delay diversity filter uses the sub-filters having a filter length set to be less than the total length $t_r+t_d$ of the entire echo path, but a sub-filter for best-estimating the impulse response in the interval $t_d$, which is an interval having a substantially significant meaning in the entire echo path, may be found. That is, because the filter length of the sub-filter of the adaptive delay diversity filter may be tightly set in conformity with the delay value $t_d$ occurring in the acoustic path, the convergence time may be shorter than that of the case where one large filter is used as in a conventional method, and error occurring in the results of the filter may be reduced by preventing unnecessary filter coefficients from participating in computation.

Because a computational load occurring when M sub-filters are always operating in the adaptive delay diversity filter is considerable, a method for allowing some of the values computed for the first sub-filter to be shared with other sub-filters is proposed as a method for reducing the computational load. Here, the value to be shared is the result of a calculation formula including portions associated only with the reference signal $x(n)$ in the equation for calculating filter coefficients.

In the above Equation 1, when the time delay $D_j$, used to obtain the reference signal $x_j(n)$ of each sub-filter from $x(n)$, and the filter length $L_j$ of each sub-filter satisfy the following Equation 13 and Equation 14, respectively, the time delay relational expression in the following Equation 16 is established, and some values, computed through the calculation formula required for computation of filter coefficients, are shared between respective sub-filters using the time delay relational expression, and thus a computational load may be reduced.

$$D_j = (j-1)D + D_{const}, j=1, \ldots, M \quad \text{[Equation 13]}$$

Here, D is a constant having a positive integer value, and $D_{const}$ is a constant having an integer value.

The above Equation 13 indicates that reference signals used between adjacent sub-filters are time-delayed at regular intervals of D.

The following Equation 14 indicates that filter lengths of all sub-filters forming the adaptive delay diversity filter are identical to each other.

$$L_1 = L_2 = \ldots = L_M = L \quad \text{[Equation 14]}$$

Based on the above Equation 1 and Equation 13, the following Equation 15 is established.

$$x_j(n) = x_{j-1}(n-D), j=2, \ldots, M \quad \text{[Equation 15]}$$

In Equation 15, $x_j(n)$ is the reference signal of the j-th sub-filter.

When the condition of Equation 14 is added to the above Equation 15, the time delay relational expression of the following Equation 16 is established.

$$\mathbf{x}_j(n) = \mathbf{x}_{j-i}(n-D), j=2, \ldots, M \quad \text{[Equation 16]}$$

In Equation 16, $\mathbf{x}_j(n)$ is the reference signal vector of the j-th sub-filter and is as defined in Equation 2.

Therefore, when the filter lengths of respective sub-filters have the same value (e.g., L), as shown in the above Equations 13 and 14, and all of the time differences between reference signals used by respective sub-filters are identical to D, the relational expression of Equation 30 or Equation 31, which will be described later, may be obtained based on the above Equation 16, and a computational load may be reduced using the relational expression.

FIG. 3C is a diagram illustrating an example in which sub-filters forming the adaptive delay diversity filter are limited to satisfy the above Equations 13 and 14, and this example may be regarded as the case that is mainly used when the performance and computational load of the filter are taken into consideration.

Figure 5A:
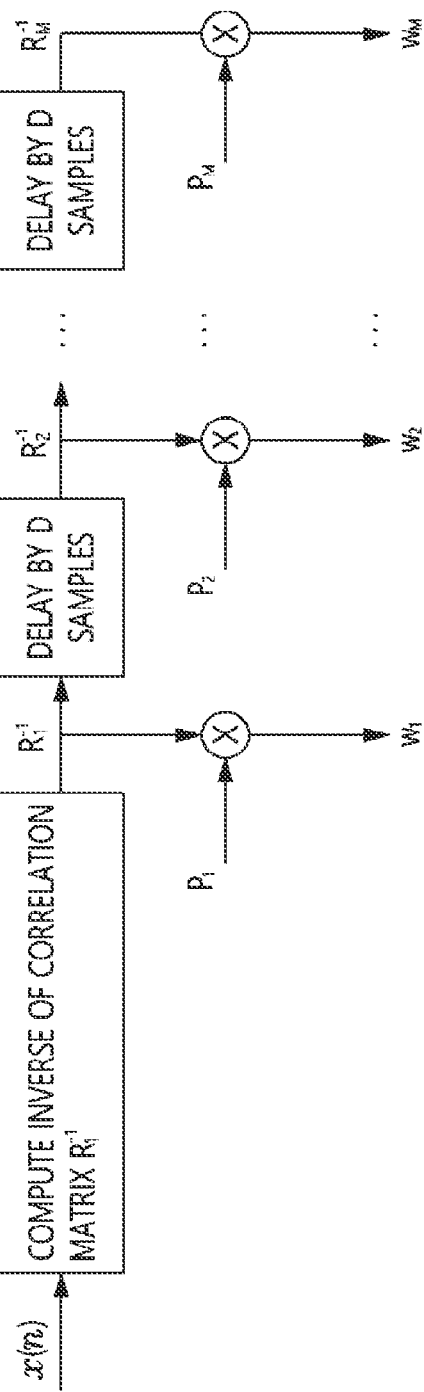
FIG. 5A is a diagram for explaining a filter coefficient calculation for reducing a computational load in each sub-filter according to an embodiment of the present disclosure.
Figure 5B:
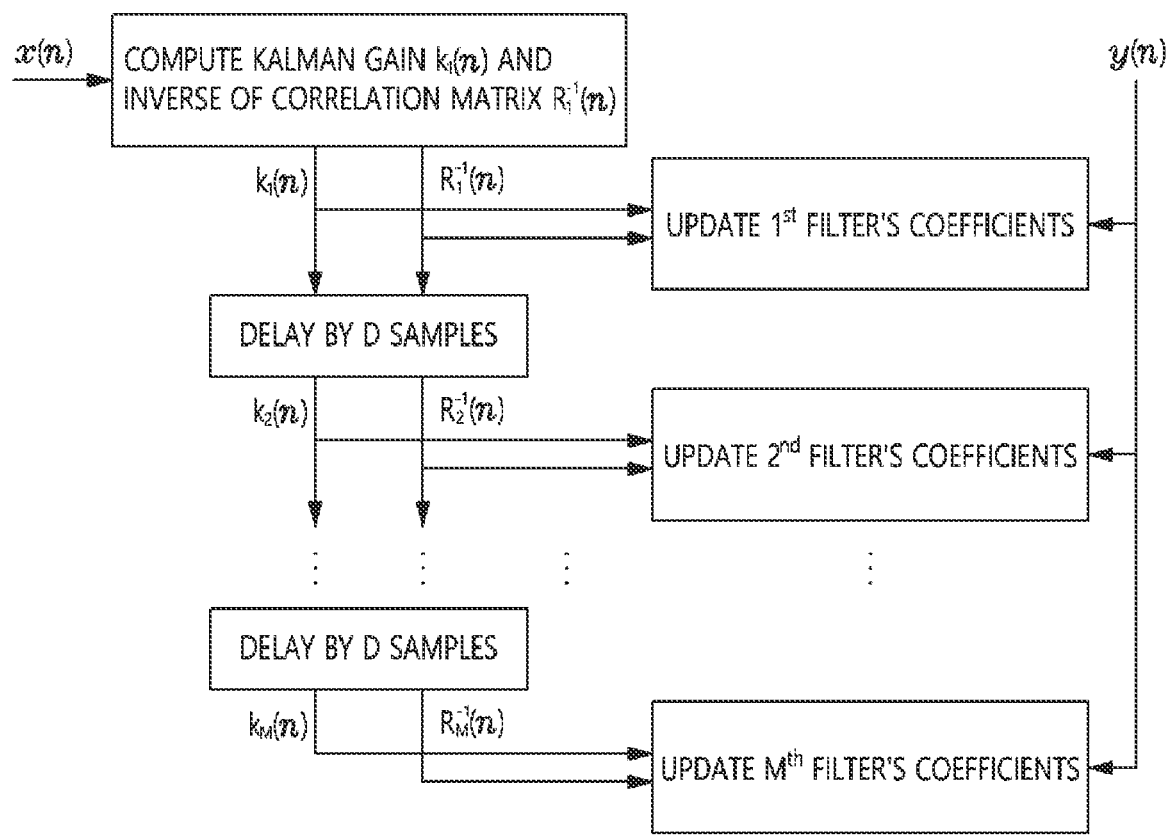
FIG. 5B is a diagram for explaining another example of a filter coefficient calculation for reducing a computational load in each sub-filter according to an embodiment of the present disclosure.
Figure 5C:
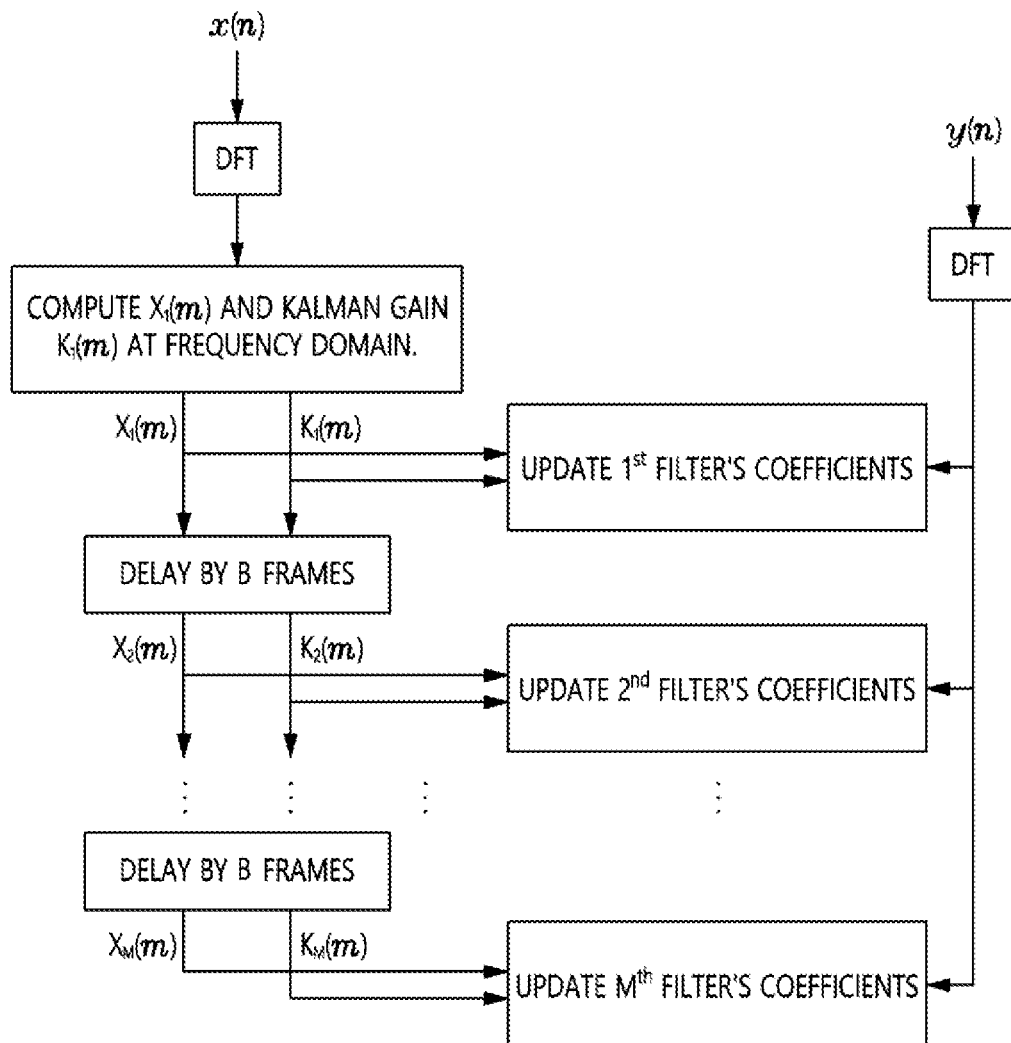
FIG. 5C is a diagram for explaining a further example of a filter coefficient calculation for reducing a computational load in each sub-filter according to an embodiment of the present disclosure.

In FIGS. 5a, 5b, and 5c, a method for reducing a computational load based on a time delay relational expression is described using, by way of example, three adaptive filter algorithms, wherein the conditions of the above Equations 13 and 14 are assumed. The reason for describing the following three adaptive filter algorithms as examples is to describe a method for, when a well-known adaptive filter algorithm is applied to and used in the adaptive delay diversity filter, reducing a computational load by skipping some computations of the filter coefficient calculation formula for the remaining sub-filters other than the one sub-filter among multiple sub-filters, rather than to derive a new algorithm.

FIG. 5A is a diagram for explaining a filter coefficient calculation for reducing a computational load in each sub-filter of an adaptive delay diversity filter according to an embodiment of the present disclosure, and illustrates an example in which each sub-filter is operated based on a Wiener filter algorithm.

For example, when the solution of each sub-filter is obtained based on the Wiener filter, $w_j(n)$ may be computed using the following Equation 17.

$$w_j(n) = R_j^{-1}(n) p_j(n)$$

$$p_j(n) = \Sigma_{i=0}^{n} \lambda^{(n-i)} y(i) x_j(i)$$

$$R_j(n) = \Sigma_{i=0}^{n} \lambda^{(n-i)} x_j(i) x_j^T(i) \qquad \text{[Equation 17]}$$

In the above Equation 17, $\lambda$ is a forgetting factor.

In order to obtain $w_j(n)$ from Equation 17, $R_j^{-1}(n)$ of each sub-filter must be computed, wherein only $x_j(n)$ defined in the above Equation 2 is used as a variable value in the calculation formula of $R_j(n)$ in the above Equation 17. As illustrated in the above Equation 15, the reference signal of each sub-filter is a time-delayed version of the reference signal of the preceding sub-filter, and thus a time delay relational expression, such as that shown in the following Equation 18, may be obtained for $R_j(n)$ and $R_j^{-1}(n)$ based on the time delay relational expression of the above Equation 16.

$$R_j(n) = R_{j-1}(n), j=2, \ldots, M$$

$$R_j^{-1}(n) = R_{j-1}^{-1}(n), j=2, \ldots, M \qquad \text{[Equation 18]}$$

Therefore, $R_1^{-1}(n)$ may be directly obtained through computation, and the values of $R_2^{-1}(n), \ldots, R_M^{-1}(n)$ may be obtained with reference to the past value of $R_1^{-1}(n)$ without being computed. Therefore, because $w_1(n)$ may be obtained using $R_1^{-1}(n)$, which is directly obtained through computation, and $w_2(n), \ldots, w_M(n)$ may be obtained with reference to the past value of $R_1^{-1}(n)$, the filter coefficients of respective sub-filters from the second sub-filter, other than the first sub-filter, may be efficiently calculated through the structure illustrated in FIG. 5A without needing to directly compute the inverse matrix of a correlation matrix while filter coefficients are obtained. By means of this structure, computation of the inverse matrix of the correlation matrix is performed only once, rather than M times, for each time period so as to obtain the filter coefficients of M sub-filters, thus reducing a computational load. In this way, a method for sharing required calculation values when calculating filter coefficients between sub-filters may also be applied to the following Recursive Least Square (RLS) algorithm, in addition to the Wiener filter. This will be described below with reference to FIG. 5B.

FIG. 5B is a diagram for explaining another example of a filter coefficient calculation for reducing a computational load in each sub-filter of an adaptive delay diversity filter according to an embodiment of the present disclosure, and illustrates an example in which each sub-filter is operated based on a Recursive Least Square (RLS) algorithm.

For example, when the filter coefficients of respective sub-filters are calculated using the Recursive Least Square (RLS) algorithm, a formula for updating the RLS algorithm for the j-th sub-filter is represented by the following Equation 19.

$$\hat{y}_j(n) = w_j^T(n-1) x_j(n) \qquad \text{[Equation 19]}$$

$$e_j(n) = y(n) - \hat{y}_j(n)$$

$$k_j(n) = \frac{R_j^{-1}(n-1) x_j(n)}{\lambda + x_j^T(n) R_j^{-1}(n-1) x_j(n)}$$

$$R_j^{-1}(n) = \lambda^{-1} [R_j^{-1}(n-1) - k_j(n) x_j^T(n) R_j^{-1}(n-1)]$$

$$w_j(n) = w_j(n-1) + k_j(n) e_j(n)$$

Here, $k_j(n)$ is the Kalman gain vector of the j-th sub-filter, and $R_j^{-1}(n)$ may be the inverse matrix of the correlation matrix for the j-th sub-filter.

As shown in the above Equation 15, the reference signal of each sub-filter is a time-delayed version of the reference signal of the preceding sub-filter, and thus the following Equation 20 may be established.

$$x_j(n) = x_{j-1}(n-D), j=2, \ldots M$$

$$R_j^{-1}(n) = R_{j-1}^{-1}(n-D), j=2, \ldots M$$

$$k_j(n) = k_{j-1}(n-D), j=2, \ldots M \qquad \text{[Equation 20]}$$

Accordingly, when the filter coefficient of the first sub-filter is obtained, $k_1(n)$ and $R_1^{-1}(n)$ must be directly computed using a formula present in the update equation of the RLS algorithm, but, when the filter coefficients of second and subsequent sub-filters are obtained, the filter coefficients may be calculated using the delayed values of $k_1(n)$ and $R_1^{-1}(n)$ calculated by the first sub-filter. That is, by means of the structure illustrated in the drawing, calculation of the Kalman gain vector and the inverse matrix of the correlation matrix is performed only once, rather than M times, for the M sub-filters, thus reducing a computational load.

FIG. 5C is a diagram for explaining another example of a filter coefficient calculation for reducing a computational load in each sub-filter of an adaptive delay diversity filter according to an embodiment of the present disclosure, and illustrates an example in which each sub-filter is operated based on a Partitioned Block Frequency Domain Adaptive Filter (PBFDAF) algorithm.

Even in an adaptive filter operating in the frequency domain, some calculations may be skipped using the time delay relationship, as in the case of the previous examples in which the two algorithms are used. The case where the Partitioned Block Frequency Domain Adaptive Filter (PBFDAF) algorithm is applied to each sub-filter is described by way of example. The PBFDAF adaptive filter algorithm is well known to those skilled in the art, and is implemented such that, when a filter having a filter length of L=P×N is partitioned into P filters, each of which has a partition size of N samples in the time domain, the original filter may be regarded as the sum of the partitioned filters. Accordingly, the estimate signal ŷ(n) of the filter may be represented by the total sum of the estimation values of the P filters, as represented by the following Equation 21.

$$\hat{y}(n) = \sum_{i=0}^{L-1} x(n-i) h_i = \sum_{p=0}^{P-1} \sum_{i=0}^{N-1} x(n-Np-i)$$
$$h_{Np+i} = \sum_{p=0}^{P-1} (x^{(p)}(n))^T h^{(p)}$$

$$x^{(p)}(n) = [x(n-Np), x(n-Np-1), \ldots x(n-Np-N+1)]^T$$

$$h^{(p)} = [h_{Np}, h_{Np+1}, \ldots h_{Np+N-1}]^T \quad \text{[Equation 21]}$$

An error signal e(n) in the time domain and an error signal vector e(m) in an m-th frame (or block) may be defined by the following Equation 22.

$$e(n) = y(n) - \hat{y}(n)$$

$$y(m) = [y(mN), \ldots, y(mN+N-1)]$$

$$e(m) = [e(mN), \ldots, e(mN+N-1)] \quad \text{[Equation 22]}$$

Here, m is a frame number, and one frame may be composed of N input samples. When the equation is converted into the frequency domain and is then arranged so as to obtain the filter coefficient for minimizing the error signal e(n), the PBFDAF algorithm operating in the frequency domain may be derived. As is well known to those skilled in the art, the basic update formula of the PBFDAF adaptive filter algorithm is given by the following Equation 23.

$$x^{(p)}(m) = \text{diag}\{F[x(mN-Np-N), \ldots, x(mN-Np+N-1)]\}$$

$$X(m) = [X^{(0)}(m), X^{(1)}(m), \ldots, X^{(P-1)}(m)]$$

$$S(m) = \lambda S(m-1) + (1-\lambda) X^H(m) G_1 X(m)$$

$$K(m) = (1-\lambda) S^{-1}(m) X^H(m)$$

$$\underline{e}(m) = \underline{y}(m) - G_1 X(m) \underline{h}(m-1)$$

$$\underline{h}(m) = \underline{h}(m-1) + G_2 K(m) \underline{e}(m) \quad \text{[Equation 23]}$$

Here, X(m) is generated using only the reference signal, and may be defined, as shown in Equation 23. F may be a Discrete Fourier Transform (DFT) matrix used to perform a DFT. In the above Equation 23, $G_1$ and $G_2$ are matrixes having constant values, which are matrixes related to the DFT matrix F, and may be defined by the following Equation 24.

$$G_1 = F W_1 F^{-1} \quad \text{[Equation 24]}$$

$$W_1 = \begin{bmatrix} 0_{N \times N} & 0_{N \times N} \\ 0_{N \times N} & I_{N \times N} \end{bmatrix}$$

$$G_2 = \text{diag}\{\tilde{G}_2, \ldots, \tilde{G}_2\}$$

$$\tilde{G}_2 = F W_2 F^{-1}$$

$$w_2 = \begin{bmatrix} I_{N \times N} & 0_{N \times N} \\ 0_{N \times N} & 0_{N \times N} \end{bmatrix}$$

In the above Equation, K(m) may be a Kalman gain in the frequency domain.

The underlined symbols of values e(m) and y(m) in the time domain indicate values in the frequency domain, and may be defined by the following Equation 25.

$$\underline{e}(m) = F \begin{bmatrix} 0_{N \times 1} \\ e(m) \end{bmatrix} \quad \text{[Equation 25]}$$

$$\underline{y}(m) = F \begin{bmatrix} 0_{N \times 1} \\ y(m) \end{bmatrix}$$

As described above, when the PBFDAF algorithm is adopted and used by the adaptive delay diversity filter, the PBFDAF algorithm may be applied to each sub-filter of the adaptive delay diversity filter. Here, assuming that the number of partition blocks of the adaptive filter using the PBFDAF algorithm is P, the number of new input samples required to configure one frame is N, and a time shift or time delay D between reference signals used by respective sub-filters forming the adaptive delay diversity filter is an integer multiple of N, D may be defined by the following Equation 26.

$$D = BN \text{ (unit of } D\text{: sample, and } B \text{ is a positive integer)} \quad \text{[Equation 26]}$$

Here, D may be a time delay value between reference signals used by adjacent sub-filters, as defined in the above Equation 13, and B may be construed as a time delay value in frame (or block) units, and may typically have values within a range of 0<B≤P. When X(m) and K(m), obtained when the update equation for the PBFDAF algorithm of Equation 23 is applied to each sub-filter, are denoted by $X_j(m)$ and $K_j(m)$ (j=1, . . . , M), X(m) is a matrix including only values associated with DFT values of the reference signals x(n), without including additional variables, and reference signals by two adjacent sub-filters have the time delay relationship, such as that shown in Equation 15, and thus the matrix $X_j(m)$ may be represented by the following Equation 27.

$$X_j(m) = X_{j-1}(m-B), j=2, \ldots M \quad \text{[Equation 27]}$$

Here, m is a frame number, and B is the time delay value between reference signals used by adjacent sub-filters, and has a value in frame units. That is, since the reference signals used by the two adjacent sub-filters have a time delay relationship corresponding to B frames, $X_j(m)$ having values associated with the DFT values of the reference signals may have the time delay relationship corresponding to the B frames. In the update Equation 23, variables participating in the Kalman gain K(m) are also associated only with the reference signal x(n), and thus the following Equation 28 may be established.

$$K_j(m) = K_{j-1}(m-B), j=2, \ldots M \quad \text{[Equation 28]}$$

Therefore, the first sub-filter directly calculates $X_1(m)$ and $K_1(m)$ thereafter obtains an error signal vector $\underline{e}_1(m)$ and a filter coefficient vector $\underline{h}_1(m)$, and sub-filters from the second sub-filter may calculate $\underline{e}_j(m)$ and $\underline{h}_j(m)$ using delayed values of $X_1(m)$ and $K_1(m)$ calculated by the first sub-filter. That is, through the use of a structure such as that illustrated in FIG. 5C, calculation of $X_j(m)$ and $K_j(m)$ may be performed only once, rather than M times, for the M sub-filters, and thus a computational load may be reduced.

The forgoing examples of three types of algorithms are summarized below. When a formula v(n) represented only by the reference signals x(n) is present in the equation for calculating filter coefficients in a certain adaptive filter algorithm in the case where the certain adaptive filter algorithm is adopted and applied to each sub-filter of the adaptive delay diversity filter having the structure satisfying Equation 13 and Equation 14, the formula v(n) may be represented by a function f(•) of x(n), as given by the following Equation 29. Here, v(n) may be one of a scalar, a vector, and a matrix.

$$v(n)=f(x(n))$$ [Equation 29]

When v(n), obtained when the algorithm is applied to each sub-filter present in the adaptive delay diversity filter, is represented by $v_j(n)$ (where j=1, ..., M), $v_1(n)$ of the first sub-filter (j=1) may be directly obtained through calculation, and $v_j(n)$ at j=2, ..., M may be obtained using the time delay relational expression, such as that shown in the following Equation 30.

$$V_j(n)=v_{j-1}(n-D), j=2, \ldots M$$ [Equation 30]

In the above Equation 30, D is a value defined in Equation 13 and is a value indicating the time shift or the delay between the reference signals used by adjacent sub-filters, and n is also the value in sample units.

In an algorithm for updating filter coefficients in frame (or block) units, for example, an algorithm for updating filter coefficients in block units in the time domain, or an algorithm operating in the frequency domain, the following Equation 31 may be applied.

$$V_j(m)=v_{j-1}(m-B), j=2, \ldots M$$ [Equation 31]

In Equation 31, m is a frame number, and B is a value that is defined in Equation 26, indicates the time difference between reference signals used by adjacent sub-filters, and is the value in frame units.

Figure 6:
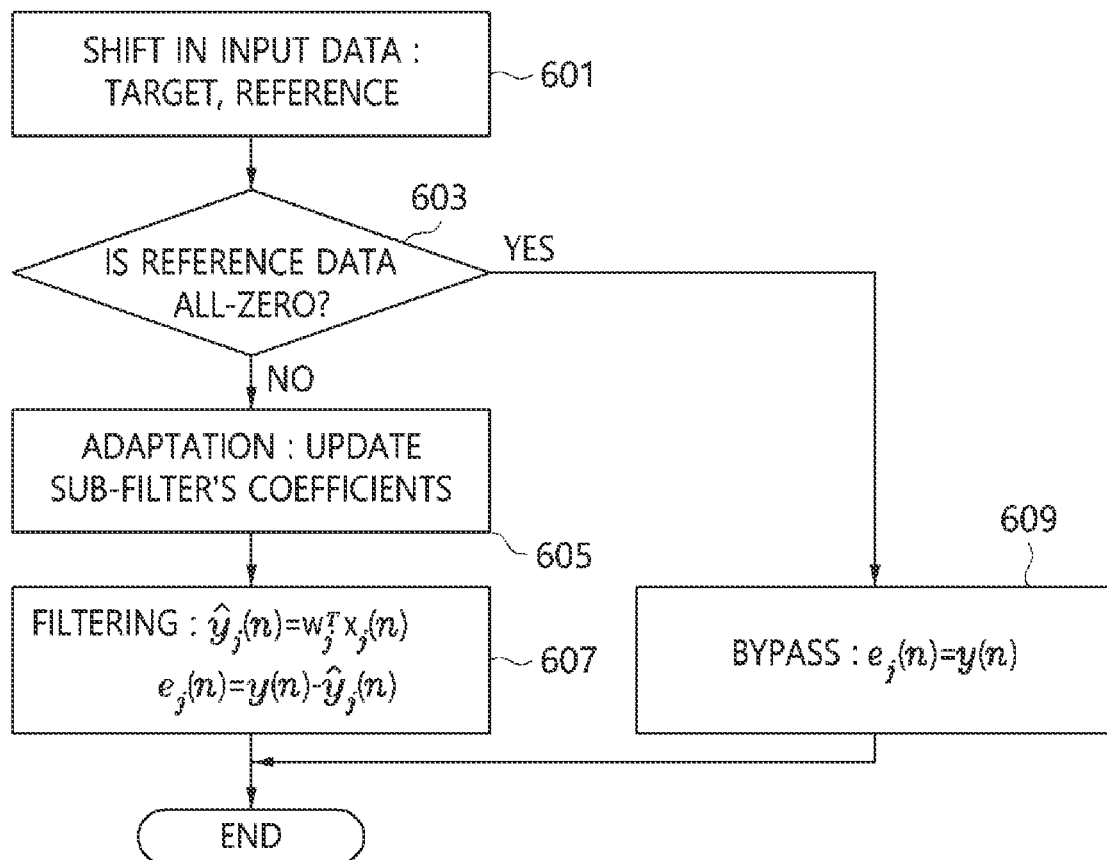
FIG. 6 is a diagram for explaining the initial stage of operation of sub-filters of an adaptive delay diversity filter according to an embodiment of the present disclosure.

FIG. 6 is a diagram for explaining an initial stage of operation of sub-filters of an adaptive delay diversity filter according to an embodiment of the present disclosure.

The adaptive delay diversity filter is composed of a total of M sub-filters, and in the initial stage, all sub-filters are initiated in an active state, switch to an inactive state through a pruning operation, and sub-filters in the inactive state are excluded from all computation procedures. FIG. 6 illustrates a process in which one active sub-filter is operated. Referring to FIG. 6, in the initial stage of the operation of the filter, while a reference signal having values other than 0 starts to be input from a 1st sub-filter (first sub-filter), subsequent sub-filters also take on reference signal values other than 0 with the lapse of time. Respective sub-filters are initially in an active state, but sub-filters that have not yet started adaptation have a filter coefficient of 0, and may then be considered to perform a bypass operation of presenting the input target signal as output without change. Therefore, it may be considered that the sub-filters are initially in an active state, but subsequent sub-filters that have not yet started adaptation have hardly any influence on a computational load.

When a description is made with reference to the attached drawings, sub-filters in an active state (active sub-filters) may acquire (shift in) target signals and reference signals, which are used as input data, at step 601, and may check whether all reference signals are 0 at step 603. When data in which at least some of the reference signals are not '0' is input, the corresponding sub-filter performs adaptation at step 605. Here, adaptation refers to updating of coefficients of sub-filters to minimize an estimation error, and the method of adaptation is determined depending on the type of the adaptive filter algorithm that is adopted by the corresponding sub-filter. At step 607, filtering ($\hat{y}_j(n)=w_j^T x_j(n)$, and $e_j(n)=y(n)-\hat{y}_j(n)$) may be performed using the filter coefficients obtained at step 605. At step 603, when the entire reference data is 0, the corresponding sub-filter may branch to step 609 where bypassing of the input signals ($e_j(n)=\hat{y}_j(n)$) may be performed.

In the adaptive delay diversity filter, only sub-filters in an active state, among M sub-filters, are operated for each time period, one sub-filter having the best performance metric value is selected as the best filter, and the output of the selected sub-filter is selected as the output of the adaptive delay diversity filter. This process is illustrated in FIG. 7.

Figure 7:
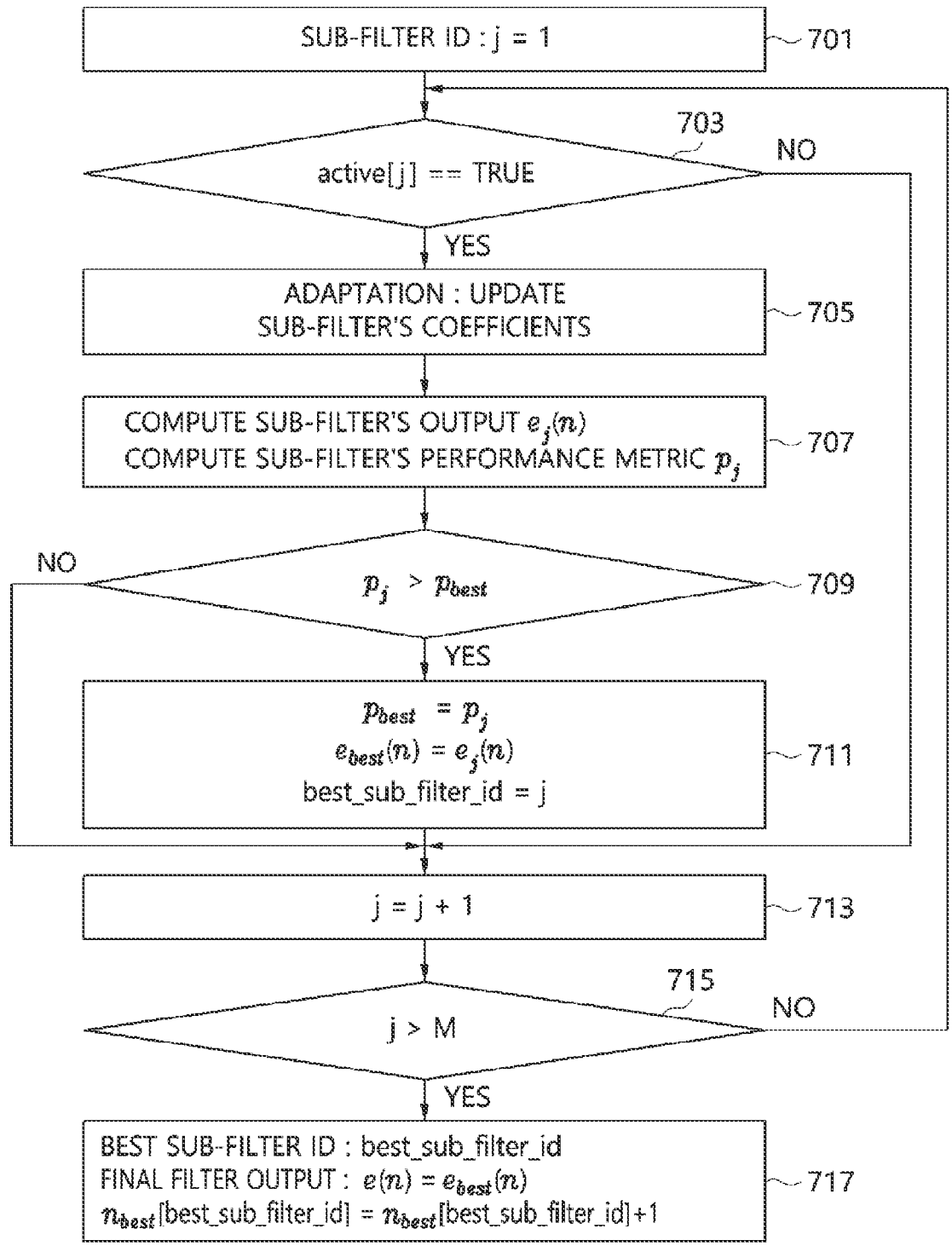
FIG. 7 is a diagram for explaining an example in which a best filter is selected from among multiple sub-filters so as to determine final output and in which the output of the selected sub-filter is selected as the final output according to an embodiment of the present disclosure.

FIG. 7 is a diagram for explaining an example in which the best filter is selected from among multiple sub-filters so as to determine a final output signal and in which the output of the selected sub-filter is selected as the final output.

Referring to FIG. 7, in order to perform adaptation and generate filter outputs only for active filters among a total of M sub-filters, whether a corresponding sub-filter is in an active state is checked at step 703. When the corresponding sub-filter is in an active state, the echo canceller 131c may update the filter coefficient of the sub-filter at step 705, which is an adaptation step. Next, the echo canceller 131c may calculate the output $e_j(n)$ of the sub-filter and the performance metric $p_j$ of the sub-filter at step 707.

Figure 15:
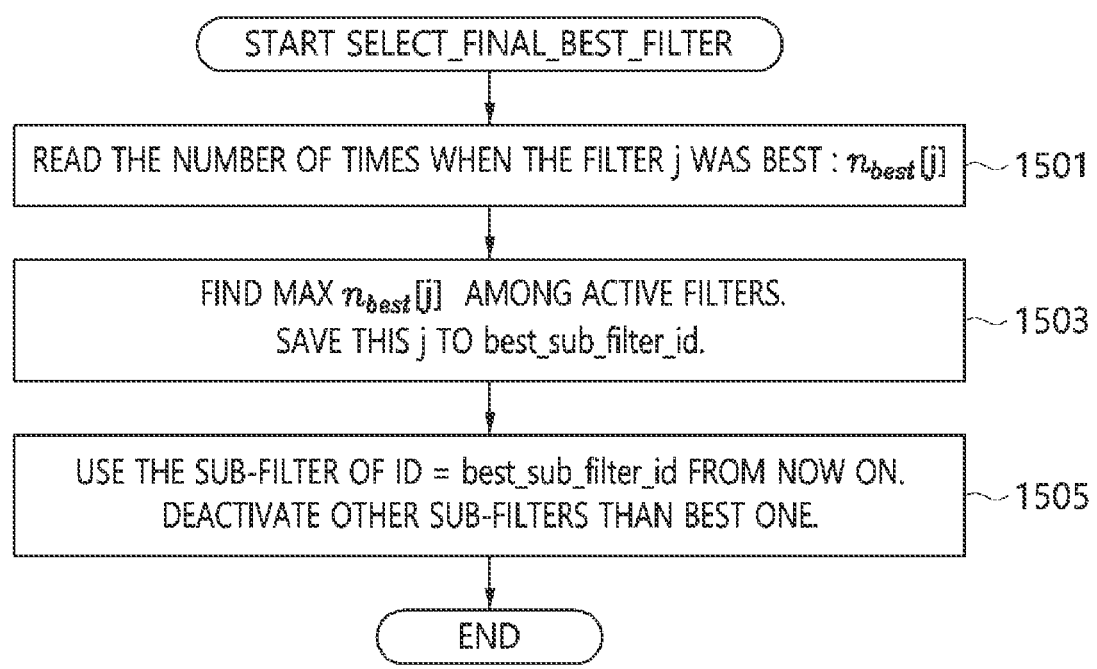
FIG. 15 is a diagram for explaining a further example of a best filter selection method according to an embodiment of the present disclosure.

At steps 709 and 711, the echo canceller 131c saves the ID of the sub-filter having the best performance metric to best_sub_filter_id, and saves the output value of the sub-filter to $e_{best}(n)$. When comparisons between all sub-filters are completed, the value of $e_{best}(n)$ is determined to be the final filter output e(n) at step 717. At step 717, the value of $n_{best}[\ ]$ is the value in which the frequency at which each of the sub-filters was selected as the best filter is recorded, and may be used later for a final filter selection procedure, as illustrated in FIG. 15.

Meanwhile, at step 703, when the j-th sub-filter is not in an active state, the echo canceller 131c may skip subsequent steps, for example, steps 705, 707, 709, and 711.

In this way, whenever new input is received, the adaptive delay diversity filter allows multiple active sub-filters to generate respective outputs through filtering, selects the best output from among the outputs of the sub-filters, and uses the selected output as the final output of the adaptive delay diversity filter.

Figure 8:
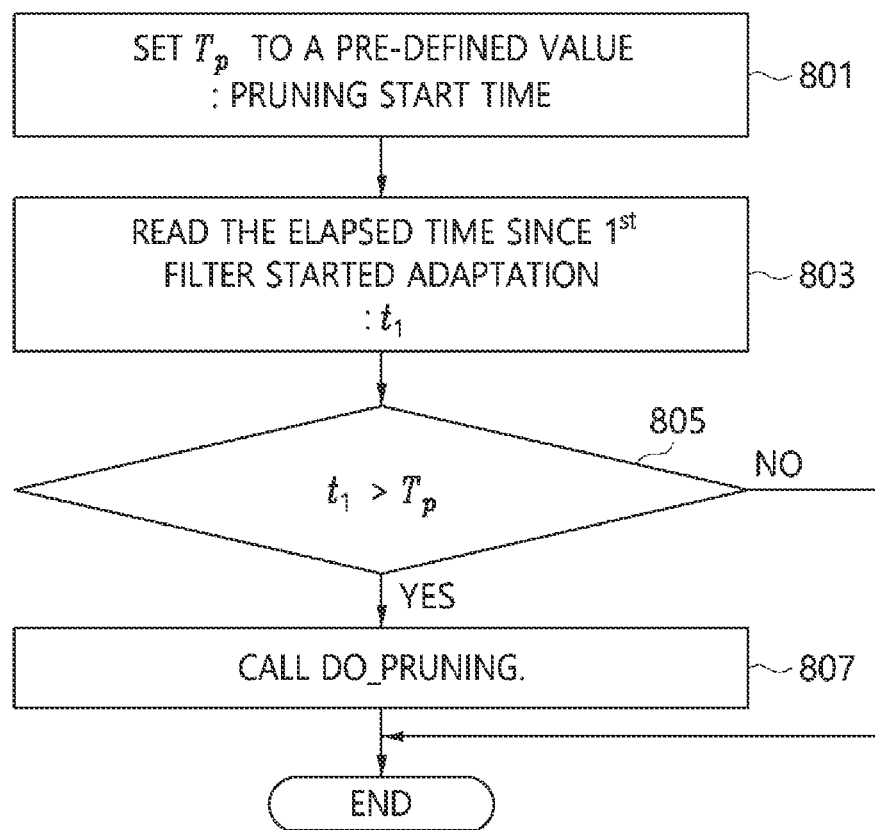
FIG. 8 is a diagram for explaining the initial stage of pruning according to an embodiment of the present disclosure.

FIG. 8 is a diagram for explaining the initial stage of pruning according to an embodiment of the present disclosure.

As described above, the echo canceller 131c (or the audio-processing unit 130 or the processor 120) may reduce a computational load by performing computation related to a formula required for calculation of filter coefficients only once, rather than M times, during a process for calculating filter coefficients of M sub-filters, and may further decrease a computational load by additionally applying a pruning method. For example, in the adaptive delay diversity filter, a maximum of M sub-filters may simultaneously perform adaptation, in which case a required computational load is increased, and thus the echo canceller 131c checks the performance of each sub-filter for each time period, and removes a sub-filter, the performance of which is deteriorated, using a pruning method, with the result that a computational load may be reduced.

In relation to this, referring to FIG. 8, the echo canceller 131c (or the adaptive delay diversity filter) may set a predefined value $T_p$ for the start time of the pruning operation at step 801 (Set $T_p$ to a predefined value).

Next, at step 803, the echo canceller 131c may read the time $t_1$ elapsed since the time at which the first sub-filter started adaptation to the current time.

Next at step 805, the echo canceller 131c may determine whether the elapsed time $t_1$ is greater than the predefined pruning start time $T_p$. If it is determined that the elapsed time $t_1$ is greater than the pruning start time $T_p$, the echo canceller 131c may call a program (or an algorithm or a function) for starting pruning at step 807. Meanwhile, at step 805, if it is determined that the elapsed time $t_1$ is less than the predefined pruning start time $T_p$, the echo canceller 131c may skip pruning at step 807.

Figure 9:
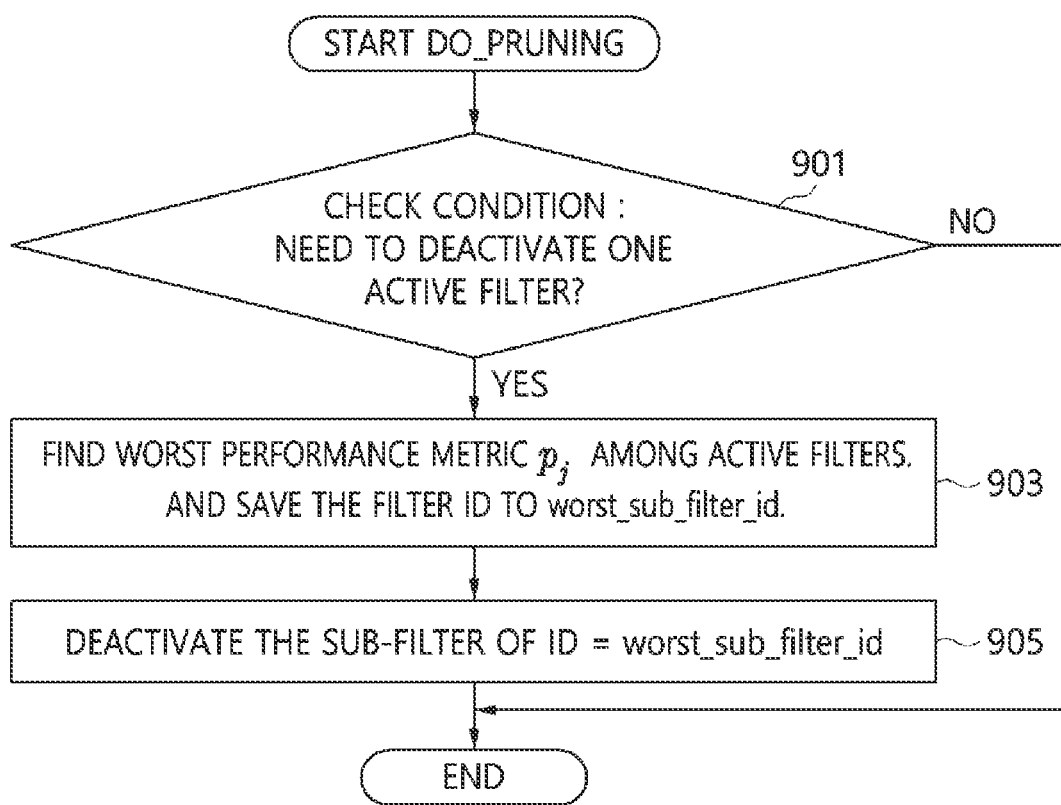
FIG. 9 is a diagram for explaining an example of a method for deactivating one worst sub-filter during a pruning operation according to an embodiment of the present disclosure.

FIG. 9 is a diagram for explaining an example of a method for deactivating one sub-filter during a pruning operation according to an embodiment of the present disclosure. This method may be used to gradually reduce the number of active sub-filters by one while being repeatedly utilized.

Referring to FIG. 9, the echo canceller 131c (or the audio-processing unit 130 or the processor 120) calls a function (or a program or an algorithm) for performing a pruning operation, and thereafter checks whether the situation occurs in which one of sub-filters in an active state (active sub-filters) needs to be deactivated at step 901. When the corresponding situation occurs, the echo canceller 131c may find a sub-filter having the worst performance metric $p_j$ among active filters at step 903, and may allocate the ID of the found sub-filter to the worst filter ID worst_sub_filter_id.

Next, the echo canceller 131c may perform control such that the sub-filter corresponding to the worst filter ID is excluded from a computation procedure such as adaptation and filtering by deactivating the sub-filter corresponding to the worst filter ID at step 905. At step 901, when the situation in which one active filter needs to be deactivated does not occur, the echo canceller 131c may skip steps 903 and 905.

Figure 10:
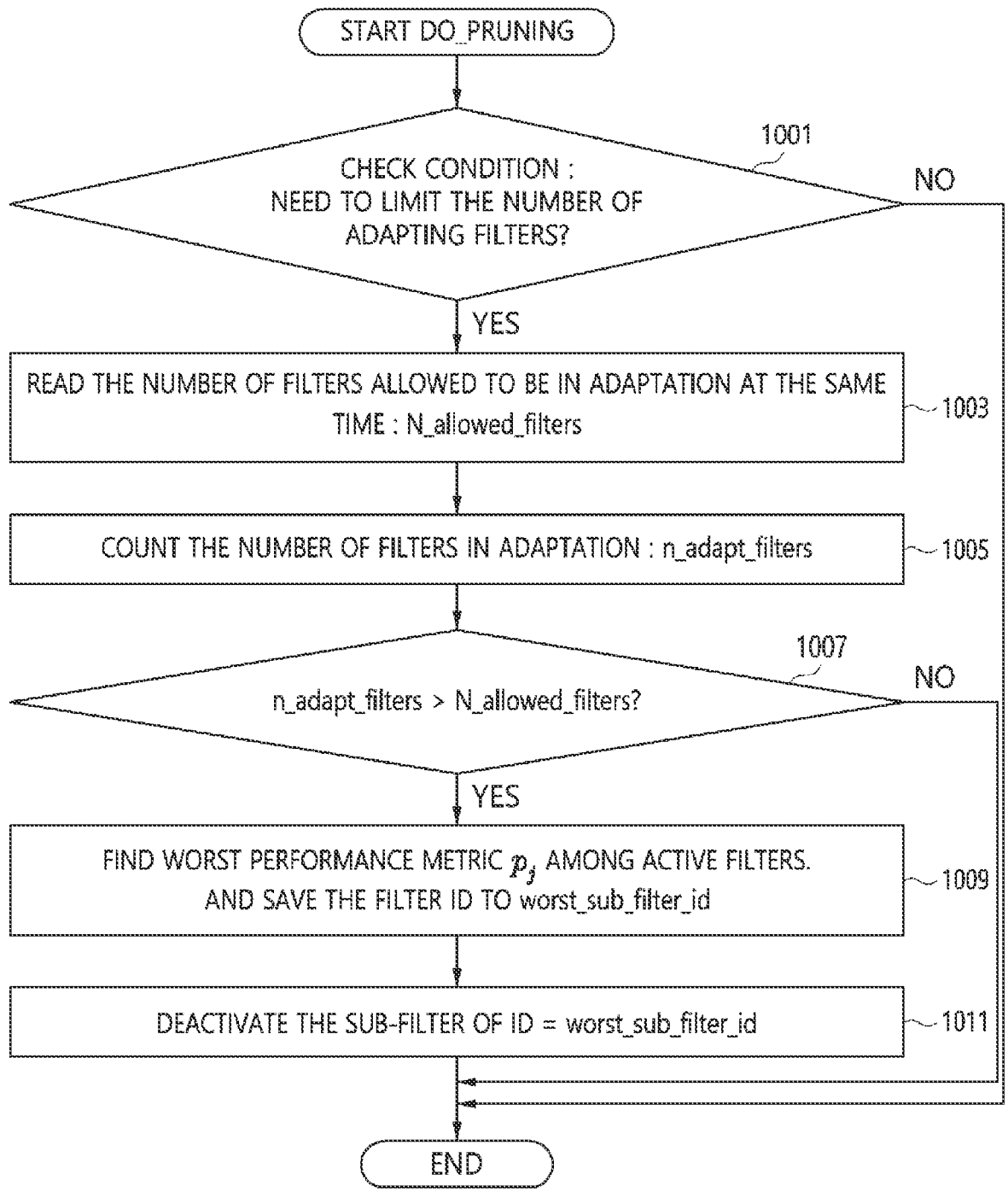
FIG. 10 is a diagram illustrating an example of a method for limiting the number of sub-filters participating in adaptation according to an embodiment of the present disclosure.

FIG. 10 is a diagram illustrating an example of a method for limiting the number of sub-filters that perform adaptation according to an embodiment of the present disclosure.

The adaptive delay diversity filter used in the echo canceller 131c is composed of multiple sub-filters, wherein, when all of the multiple sub-filters perform adaptation to update filter coefficients, a computational load is greatly increased, and thus the peak computational load may be controlled by limiting the number of sub-filters that perform adaptation.

Referring to FIG. 10, the echo canceller 131c checks whether the situation occurs in which the number of filters that perform an adaptation process needs to be limited at step 1001. For example, the echo canceller 131c may check whether a predefined condition is satisfied in association with at least some of various factors related to performance for echo cancellation, such as the performance of a computer, the type of application currently being executed or the amount of resources used by the application. Alternatively, the echo canceller 131c may check whether the number of sub-filters is to be limited depending on the status of the current system performance using information in which (e.g., a lookup table) settings of the number of sub-filters to be used depending on the performance of the system (e.g., CPU) are stored. When the condition in which the number of filters that perform the adaptation operation is to be limited is satisfied, the echo canceller 131c may read the number of filters that are allowed to perform simultaneous adaptation (i.e., N_allowed_filters) at step 1003. The number of filters allowed to perform simultaneous adaptation may be stored in advance in, for example, the memory 110 or may be calculated according to the performance of a CPU that is used in real time.

Thereafter, at step 1005, the echo canceller 131c may count the number of filters n_adapt_filters that currently perform the adaptation operation.

Next, at step 1007, the echo canceller 131c may check whether the number of filters n_adapt_filters that perform the adaptation operation is greater than the number of filters N_allowed_filters that are allowed to perform simultaneous adaptation. If the number of filters n_adapt_filters that perform the adaptation operation is greater than the number of filters N_allowed_filters that are allowed to perform simultaneous adaptation, the echo canceller 131c may find the filter having the worst performance metric $p_j$ among the active filters at step 1009, and may save the ID of the corresponding filter to the worst filter ID worst_sub_filter_id.

At step 1011, the echo canceller 131c may deactivate the sub-filter corresponding to the worst filter ID, and may then exclude the corresponding sub-filter so that the sub-filter does not participate in computation any further. Meanwhile, when the limit condition set at step 1001 is not satisfied, the echo canceller 131c may skip the procedure from steps 1003 to 1011. In this way, the echo canceller 131c may perform filtering in the state in which a number of sub-filters less than or equal to the allowed number of sub-filters (N_allowed_filters), among the multiple sub-filters, are active.

Figure 11:
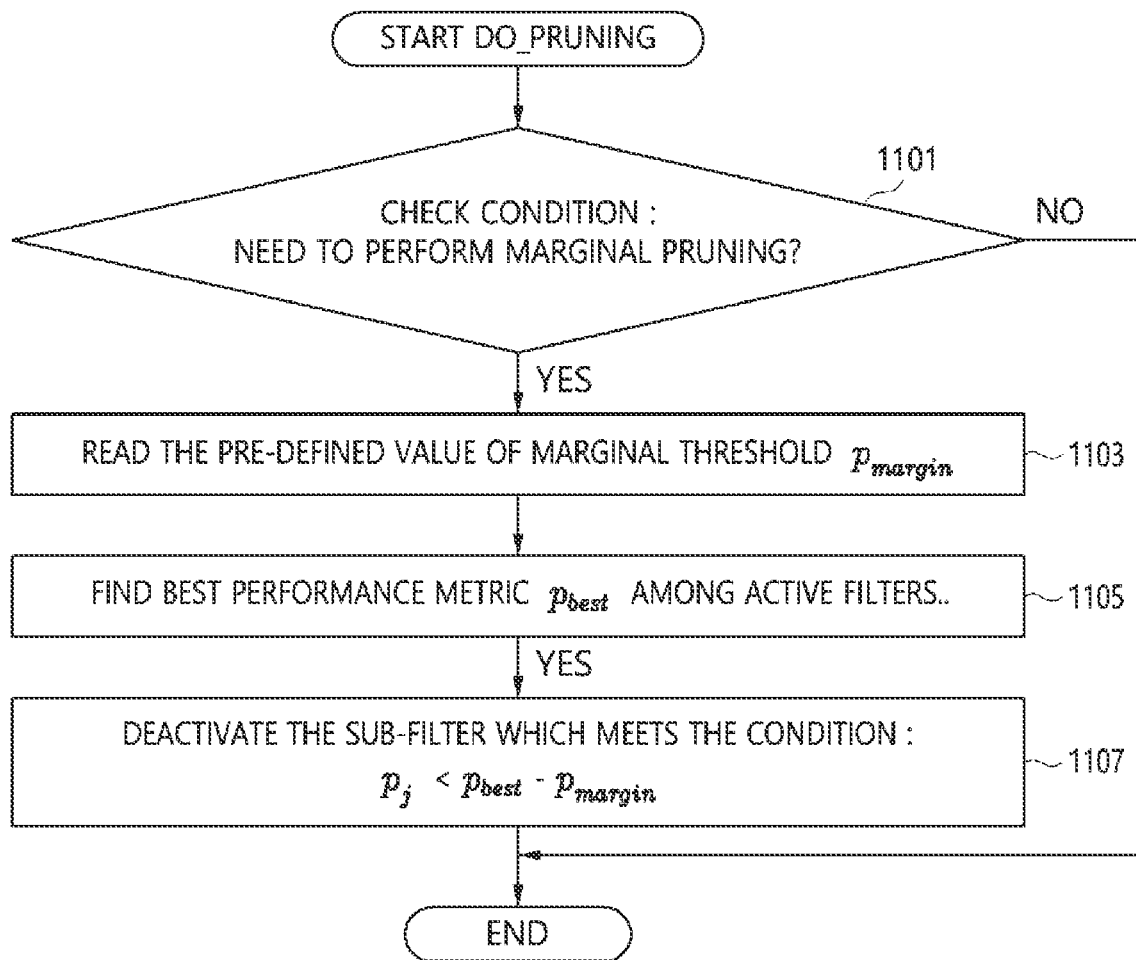
FIG. 11 is a diagram illustrating an example of a method for removing a sub-filter through marginal pruning according to an embodiment of the present disclosure.

FIG. 11 is a diagram illustrating an example of a method for removing sub-filters using pruning according to an embodiment of the present disclosure, and is a diagram showing an example that can be used when it is desired to remove only sub-filters having performance less than or equal to a certain level compared to the best filter, and to maintain sub-filters having performance equal to or greater than the certain level in an active state.

Referring to FIG. 11, the echo canceller 131c may check whether a condition in which a marginal pruning operation needs to be performed is satisfied at step 1101. The setting of the marginal pruning operation may be adjusted depending on, for example, the performance of a system, the type of application, user's settings, or the like. Alternatively, the marginal pruning operation may be automatically applied through the execution of an echo cancellation program.

When the performance of the marginal pruning operation is requested, the echo canceller 131c may read a predefined marginal threshold value $P_{m\ arg\ in}$ at step 1103. The marginal threshold value $P_{m\ arg\ in}$ may be stored in advance in the memory 110.

Next, the echo canceller 131c may find the best performance metric value $p_{best}$ among the performance metric values for active sub-filters at step 1105. Thereafter, the echo canceller 131c may find sub-filters satisfying the following Equation 32 at step 1107.

$$p_j < p_{best} - p_{margin} \quad j=1,\ldots,M \qquad \text{[Equation 32]}$$

The echo canceller 131c may deactivate the sub-filters satisfying the above equation. The marginal threshold value may be a preset constant value, and the speed at which the sub-filters switch to an inactive state may be controlled by adjusting the marginal threshold value. Meanwhile, the electronic device may change the marginal threshold value depending on the system performance or may change the marginal threshold value depending on the frequency at which an error occurred in a specific application (e.g., a speech recognition function). For example, when the frequency of error occurrence is high, the marginal threshold value may rise (or fall).

Respective methods for limiting sub-filters, described above with reference to FIGS. 9 to 11, may be independently applied or may be used together in combination. The adaptive delay diversity filter may use a method for maintaining only one sub-filter having the best performance in an active state and deactivating the remaining sub-filters after a predetermined time has elapsed. This method is illustrated in FIGS. 12 to 15.

Figure 12:
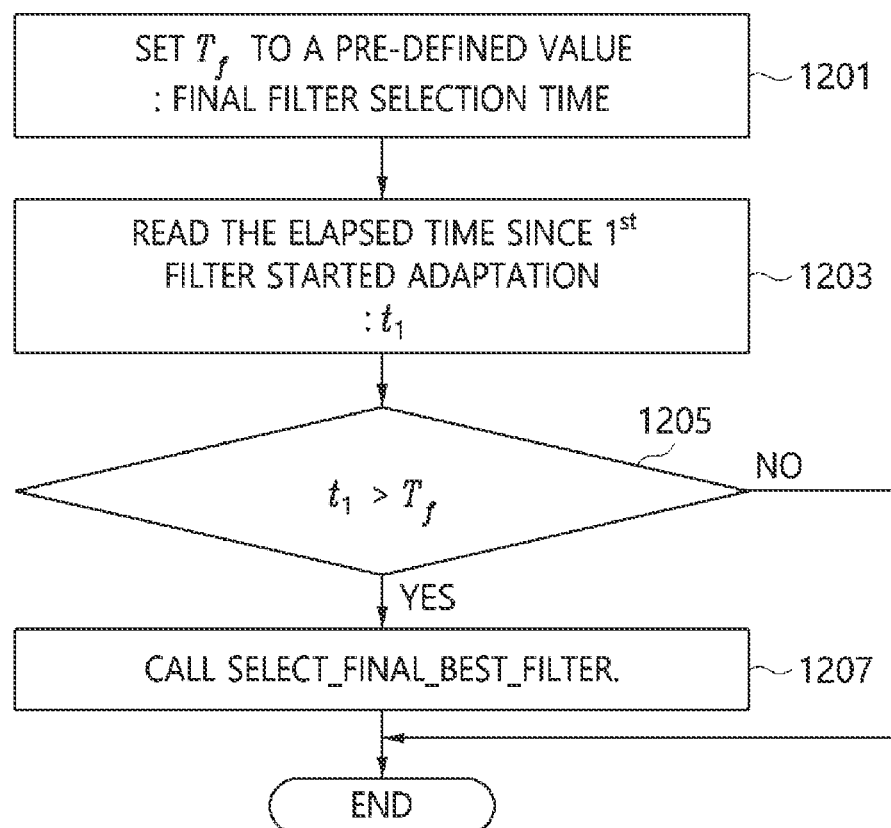
FIG. 12 is a diagram for explaining an example of an initial setting method for selecting the best filter according to an embodiment of the present disclosure.

FIG. 12 is a diagram for explaining an example of an initial setting method for finally selecting the best filter according to an embodiment of the present disclosure.

Referring to FIG. 12, the echo canceller 131c (or the audio-processing unit 130 or the processor 120) may set a final filter selection time $T_f$ to a predefined value at step 1201.

Next, the echo canceller 131c may read the time $t_1$ elapsed since the first sub-filter started adaptation to the current time point at step 1203, and may determine whether the elapsed time $t_1$ is greater than the final filter selection time $T_f$ at step 1205. If it is determined that $t_1$ is greater than $T_f$, the echo canceller 131c may call a function (or a program or an algorithm) for final filter selection at step 1207. Meanwhile, if it is determined at step 1205 that $t_1$ is less than $T_f$, step 1207 may be skipped.

Figure 13:
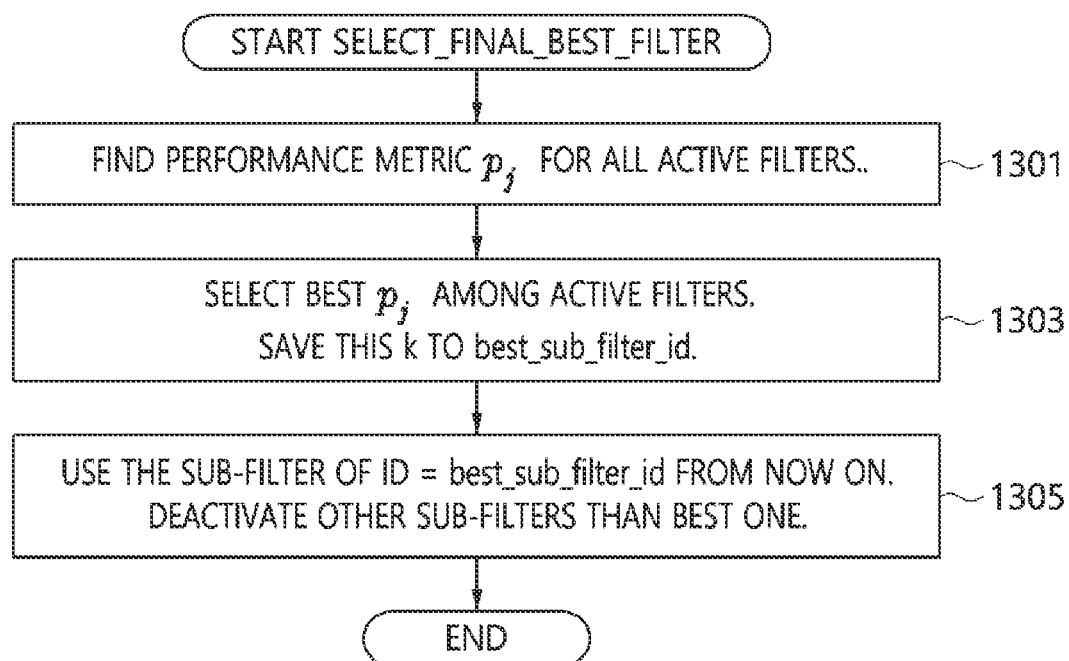
FIG. 13 is a diagram for explaining an example of a best filter selection method according to an embodiment of the present disclosure.

FIG. 13 is a diagram for explaining an example of a best filter selection method according to an embodiment of the present disclosure.

Referring to FIG. 13, as described above with reference to FIG. 12, when the preset final filter selection time has elapsed, the echo canceller 131c may find performance metric values $p_j$ for all active filters at step 1301.

Next, the echo canceller 131c may select a filter having the best performance metric value $p_j$, from among the active filters, and may save the ID of the selected filter as the best filter ID best_sub_filter_id at step 1303.

Next, the echo canceller 131c may perform filtering by operating only the sub-filter corresponding to the best filter ID, best_sub_filter_id and deactivating the remaining sub-filters other than the best sub-filter at step 1305.

Figure 14:
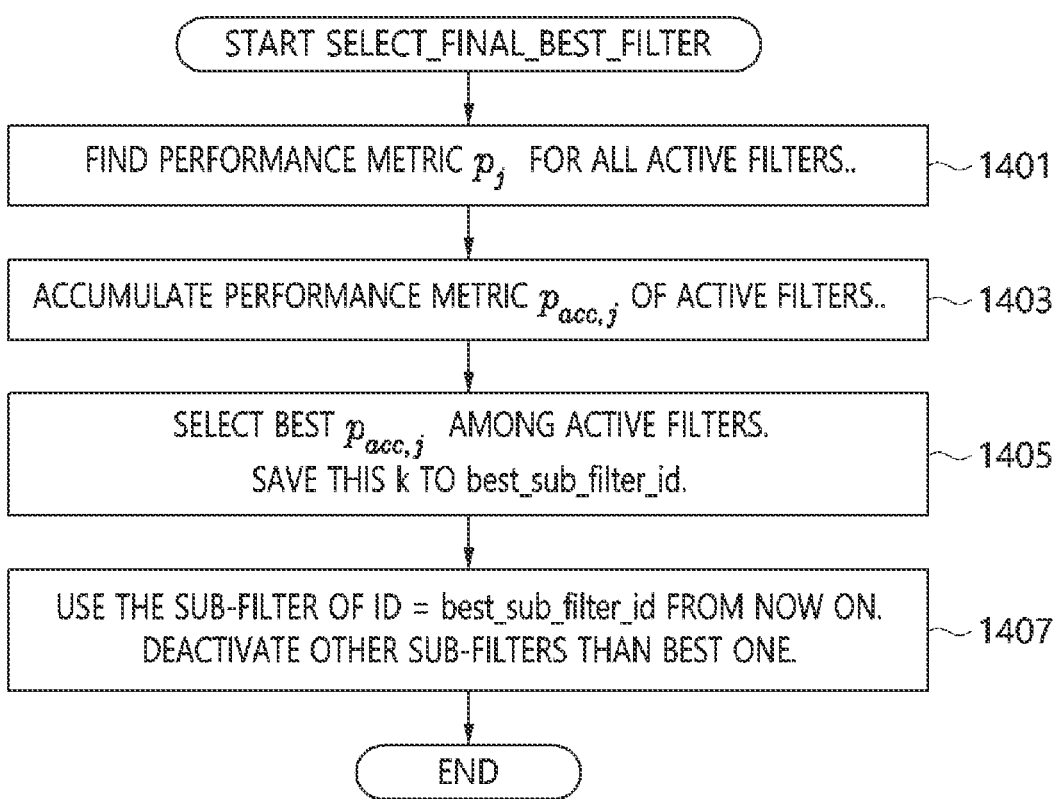
FIG. 14 is a diagram for explaining another example of a best filter selection method according to an embodiment of the present disclosure.

FIG. 14 is a diagram illustrating another example of a final filter selection method according to an embodiment of the present disclosure.

Referring to FIG. 14, as described above with reference to FIG. 12, when the preset final filter selection time has elapsed, the echo canceller 131c may find performance metric values $p_j$ for all active filters at step 1401.

Next, the echo canceller 131c may calculate accumulated values $p_{acc,j}$ of the performance metric values for the active filters at step 1403.

Then, the echo canceller 131c may select the best accumulated performance metric value best $p_{acc,j}$ from among the active filters, and may save the ID of a sub-filter having the selected best accumulated value to the best filter ID best_sub_filter_id at step 1405.

Next, the echo canceller 131c may perform filtering by operating only the sub-filter corresponding to the best filter ID, best_sub_filter_id and deactivating the remaining sub-filters other than the best sub-filter at step 1407.

FIG. 15 is a diagram illustrating a further example of a final filter selection method according to an embodiment of the present disclosure.

Referring to FIG. 15, as described above with reference to FIG. 12, when the preset final filter selection time has elapsed, the echo canceller 131c may read the frequency (the number of times) $n_{best}[j]$ at which each of active sub-filters was previously selected as the best sub-filter at step 1501. The $n_{best}[j]$ is calculated at step 717 of FIG. 7.

Next, the echo canceller 131c may find the maximum value among the $n_{best}[j]$ values of all active sub-filters, and may save the ID of the sub-filter corresponding to the maximum value to the best filter ID best_sub_filter_id at step 1503.

Next, the echo canceller 131c may perform filtering by operating only the sub-filter corresponding to the best filter ID, best_sub_filter_id and deactivating all of the remaining sub-filters other than the best sub-filter at step 1505.

By means of the above-described pruning function, a structure for allowing the final winner to remain while respective sub-filters compete with each other may be formed, and a better output signal may be obtained using a low computational load.

Meanwhile, the method for limiting the number of sub-filters that perform adaptation so as to reduce a computational load includes additional methods other than the pruning method. For example, there is a method for reducing a computational load by allowing respective sub-filters to sequentially perform adaptation in time, instead of a scheme in which all sub-filters perform adaptation for each time period. This method may be used to reduce a computational load while accommodating the deterioration in performance that occurs as the number of times that each sub-filter performs adaptation is decreased.

As described above, the adaptive delay diversity filter included in the echo canceller 131c may be configured such that the number of sub-filters participating in adaptation does not exceed a predefined value, and may then manage a computational load so that the peak computational load does not exceed a certain level. Further, the adaptive delay diversity filter may have imposed thereon a computational load corresponding to one sub-filter by finally selecting one sub-filter through a pruning operation.

Due to the characteristics of the adaptive filter, if a target signal and a reference signal, which are input signals of the filter, are not time-aligned therebetween, and then time reversal in which the target signal is ahead of the reference signal in time occurs or if a time delay between the two signals is too large for the filter to estimate, then the filter may diverge or produce a large error signal value. Due to these characteristics, in the electronic device according to the present disclosure, as the pruning operation is continuously performed with the lapse of time, many of the sub-filters participating in adaptation have poor performance and may be quickly deactivated. For example, at the initial stage, when pieces of target and reference data, which are input for the adaptive filter, start to flow in the adaptive filter, respective sub-filters sequentially participate in adaptation, but the number of sub-filters that simultaneously participate in adaptation does not exceed a defined value due to the pruning function, wherein the sub-filters having poor performance are deactivated, and the number of active sub-filters is gradually decreased since the last sub-filter participates in adaptation, with the result that one sub-filter finally remains as a survivor. Alternatively, a predefined number of sub-filters may remain as survivors. Accordingly, the echo canceller 131c may manage a computational load so that, even if the number M of sub-filters forming the adaptive delay diversity filter is increased, the adaptive delay diversity filter has a computational load at a certain level or less, regardless of the number of sub-filters.

The present disclosure may effectively solve the situation in which variation in a time delay between speaker data and microphone data is large when it is desired to apply one echo canceller engine to all smartphone products. In particular, considering various connection cases, such as the case where the speaker and microphone of a smartphone are used as standalone, the case where a smartphone and a Bluetooth headset are connected to each other and are then used, or the case where a smartphone and Audio, Video, and Navigation (AVN) devices in a vehicle are used via Bluetooth connection, variation in the time delay may be further increased. In such an environment, the present disclosure may provide an adaptive processing method. For example, time delay values in the case where a smartphone is operated as standalone have a range from about several tens to 200 ms, but, in the case where the smartphone and the Audio, Video, and Navigation (AVN) devices in the vehicle are connected via Bluetooth, the speaker and the microphone of the vehicle are used, the time delay at this time has a range from about 500 ms to 1000 ms or more due to the addition of new transmission path. In order to effectively cancel echoes in all such cases, the adaptive filter of the echo canceller must be designed to cover a wide range of time delay. For this purpose, the present disclosure avoids setting the filter length to a large value as in conventional methods and sets the length of a filter to a value approximately corresponding to the length of an acoustic path, thus realizing a short convergence time and a small error value. Further, because values calculated through a calculation formula that is used when the filter coefficients of respective sub-filters are obtained can be shared between sub-filters using a time delay relational expression, the values are calculated only for the first sub-filter, and delayed versions of these values are used in all remaining sub-filters, and thus a computational load may be reduced. Furthermore, because the present disclosure can limit the number of filters participating in adaptation while removing sub-filters having deteriorated performance through a pruning method, rather than obtaining filter coefficient values of all sub-filters for each time period, the peak computational load may be maintained at a certain level or less even in the case where the number of sub-filters M used is increased to a very large value so as to cover large variation in time delay. Further, only one sub-filter may also be finally activated, and since then the same computational load as that when one sub-filter operates may be required. Furthermore, even in additional systems other than an audio system, when a signal transmission environment has large variation in a time delay between a target signal and a reference signal, the present disclosure may have a structure efficient for estimating of the impulse response of the transmission path or estimating of a target signal that is received after undergoing deformation.

Meanwhile, embodiments disclosed in the present specification and drawings are merely intended to present specific examples for better understanding of the present disclosure, and are not intended to limit the scope of the present disclosure. It should be understood that many variations and modifications of the basic inventive concept described herein will still fall within the spirit and scope of the present invention as defined in the appended claims and their equivalents.

What is claimed is:

1. An adaptive filter, comprising:
a transmit signal $x(n)$ transmitted from a transmitting end;
an input signal $y(n)$ collected at a receiving end;
a desired signal included in the $y(n)$; and
an adaptive delay diversity filter for estimating the desired signal using the $x(n)$ as a reference signal and using the $y(n)$ as a target signal,
wherein the adaptive delay diversity filter comprises a plurality of sub-filters,
wherein the plurality of sub-filters is composed of M sub-filters (where M is a natural number greater than 1),
wherein each sub-filter of the plurality of sub-filters is implemented as an adaptive filter,
wherein each of the sub-filters uses the $y(n)$ as a target signal,
wherein each of the sub-filters uses signals $x_j(n)$ ($j=1, \ldots, M$), obtained by time-delaying the $x(n)$ using different delay values for respective sub-filters, as respective reference signals,
wherein each of the signals $x_j(n)$ is configured to satisfy Equation 1,
wherein Equation 1 is $x_j(n)=x(n-D_j)$, $j=1, \ldots, M$, where a time delay value $D_j$ is an integer satisfying $0 \le D_1 < D_2 < \ldots < D_M$, and
wherein the adaptive delay diversity filter computes output values of respective sub-filters through filtering with respect to each input value, and selects one of the computed multiple output values as an output value of the adaptive delay diversity filter.

2. The adaptive filter of claim 1, wherein:
the plurality of sub-filters is configured such that the time delay value $D_j$ used to derive the $x_j(n)$ ($j=1, \ldots, M$) from the $x(n)$ satisfies Equation 2,
Equation 2 is $D_j=(j-1)D+D_{const}$, $j=1, \ldots, M$, where D is a constant having a positive integer value and $D_{const}$ is a constant having an integer value,
a time difference between reference signals used by two adjacent sub-filters based on Equation 2 corresponds to D samples, and
filter lengths of respective sub-filters have an identical value.

3. The adaptive filter of claim 2, wherein:
in a case where an adaptive filter algorithm for calculating filter coefficients per sample is applied to each sub-filter of the plurality of sub-filters, when there is an adaptive filter algorithm in which a formula $v(n)$ represented only by the reference signal $x(n)$ of the adaptive filter exists in a filter coefficient calculation formula present in the algorithm and in which $v(n)$ is represented by a function $f(\bullet)$ of the $x(n)$, as given by Equation 3, the Equation 3 is represented by $v(n)=f(x(n))$,
the $v(n)$ is one of a scalar, a vector, and a matrix,
n is a sample number,
when $v(n)$, obtained when the adaptive filter algorithm is applied to each of the plurality of sub-filters, is represented by $v_j(n)$ ($j=1, \ldots, M$), a value of $v_1(n)$ is computed only for a first sub-filter ($j=1$) among the plurality of sub-filters, and a value $v_j(n)$ ($j=2, \ldots, M$) for remaining sub-filters other than the first sub-filter is obtained using a time delay relational expression in Equation 4,
Equation 4 is $v_j(n)=v_{j-1}(n-D)$, $j=2, \ldots, M$, and
D in Equation 4 is a value identical to D in Equation 2.

4. The adaptive filter of claim 2, wherein:
when an adaptive filter algorithm for calculating filter coefficients per frame is applied to each sub-filter of the plurality of sub-filters, new N input data samples flow in the adaptive filter in each frame and are used to form a current frame,
when D is an integer multiple of N and satisfies Equation 5, Equation 5 is $D=BN$, where B is a positive integer value,
D in Equation 5 is a value identical to D in Equation 2,
values corresponding to the current frame of the reference signal $x(n)$ of the adaptive filter are collected and a value generated by including values of past frames of $x(n)$ in the collected values is represented by $X(m)$,
m is a frame number,
if there is an adaptive filter algorithm in which a formula $v(m)$ represented only by the $X(m)$ exists in a filter coefficient calculation formula present in the adaptive filter algorithm and in which $v(m)$ is represented by a function f(•) of the X(m), as given by Equation 6, Equation 6 is represented by v(m)=f(X(m)), the v(m) is one of a scalar, a vector, and a matrix, if v(m), obtained when the adaptive filter algorithm is applied to each of the plurality of sub-filters, is represented by $v_j(m)$ (j=1, . . . , M), a value of $v_1(m)$ is computed only for a first sub-filter (j=1) among the plurality of sub-filters, and a value of $v_j(m)$ (j=2, . . . , M) for remaining sub-filters other than the first sub-filter is obtained using a time delay relational expression in Equation 7, and Equation 7 is $v_j(m)=v_{j-1}(m-B)$, j=2, . . . , M.

5. The adaptive filter of claim 1, wherein the adaptive delay diversity filter is configured to:

deactivate an active sub-filter according to a designated condition, and allow only active sub-filters among the plurality of sub-filters to participate in computation of output values and allow deactivated sub-filters to be excluded from computation of output values while computing output values using the plurality of sub-filters.

6. The adaptive filter of claim 5, wherein the adaptive delay diversity filter is configured to compute performance metric values for respective active sub-filters among the plurality of sub-filters, find a maximum value or a minimum value among the computed performance metric values, and thereafter perform an operation of deactivating a sub-filter having the maximum performance metric value or the minimum performance metric value.

7. The adaptive filter of claim 5, wherein the adaptive delay diversity filter is configured to perform an operation of deactivating a sub-filter according to the designated condition until at least one active sub-filter or a predefined number of active sub-filters among the plurality of sub-filters remains.

8. The adaptive filter of claim 5, wherein the adaptive delay diversity filter is configured to control deactivation of a sub-filter so that a number of sub-filters that perform adaptation among the plurality of sub-filters becomes less than or equal to a predefined number of sub-filters.

9. An electronic device, comprising:

a speaker output signal x(n) collected at an audio output terminal;

a microphone input signal y(n) collected at a microphone;

an echo included in the y(n); and an echo canceller for cancelling the echo using the x(n) as a reference signal and using the y(n) as a target signal, wherein the echo canceller comprises a plurality of sub-filters, wherein the plurality of sub-filters is composed of M sub-filters (where M is a natural number greater than 1), wherein each sub filter of the plurality of sub-filters is implemented as an adaptive filter, wherein each of the sub-filters uses the y(n) as a target signal, wherein each of the sub-filters uses signals $x_j(n)$ (where j=1, . . . , M), obtained by time-delaying the x(n) using different delay values for respective sub-filters, as respective reference signals, wherein each of the signals $x_j(n)$ is configured to satisfy Equation 8, wherein Equation 8 is $x_j(n)=x(n-D_j)$, j=1, . . . , M, where a time delay value $D_j$ is an integer satisfying $0 \leq D_1 < D_2 < \ldots < D_M$, and wherein the echo canceller computes output values of respective sub-filters through filtering with respect to each input value, and selects one of the computed multiple output values as an output value of the echo canceller.

10. The electronic device of claim 9, wherein:

the plurality of sub-filters is configured such that the time delay value $D_j$ used to derive the $x_j(n)$ (j=1, . . . , M) from the x(n) satisfies Equation 9, Equation 9 is $D_j=(j-1)D+D_{const}$, j=1, . . . , M, where D is a constant having a positive integer value and $D_{const}$ is a constant having an integer value, a time difference between reference signals used by two adjacent sub-filters based on Equation 9 corresponds to D samples, and filter lengths of respective sub-filters have an identical value.

11. The electronic device of claim 10, wherein:

in a case where an adaptive filter algorithm for calculating filter coefficients per sample is applied to each sub-filter of the plurality of sub-filters, when there is an adaptive filter algorithm in which a formula v(n) represented only by the reference signal x(n) of the adaptive filter exists in a filter coefficient calculation formula present in the algorithm and in which v(n) is represented by a function f(•) of the x(n), as given by Equation 10, Equation 10 is represented by v(n)=f(x(n)), the v(n) is one of a scalar, a vector, and a matrix, n is a sample number, when v(n), obtained when the adaptive filter algorithm is applied to each of the plurality of sub-filters, is represented by $v_j(n)$ (j=1, . . . , M), a value of $v_1(n)$ is computed only for a first sub-filter (j=1) among the plurality of sub-filters, and a value of $v_j(n)$ (j=2, . . . , M) for remaining sub-filters other than the first sub-filter is obtained using a time delay relational expression in Equation 11, Equation 11 is $v_j(n)=v_{j-1}(n-D)$, j=2, . . . , M, and D in Equation 11 is a value identical to D in Equation 9.

12. The electronic device of claim 10, wherein:

when an adaptive filter algorithm for calculating filter coefficients per frame is applied to each sub-filter of the plurality of sub-filters, new N input data samples flow in the adaptive filter in each frame and are used to form a current frame, when D is an integer multiple of N and satisfies Equation 12, Equation 12 is D=BN, where B is a positive integer value, D in Equation 12 is a value identical to D in Equation 9, values corresponding to the current frame of the reference signal x(n) of the adaptive filter are collected and a value generated by including values of past frames of x(n) in the collected values is represented by X(m), m is a frame number, if there is an adaptive filter algorithm in which a formula v(m) represented only by the X(m) exists in a filter coefficient calculation formula present in the adaptive filter algorithm and in which v(m) is represented by a function f(•) of the X(m), as given by Equation 13, Equation 13 is represented by v(m)=f(X(m)), the v(m) is one of a scalar, a vector, and a matrix, if v(m), obtained when the adaptive filter algorithm is applied to each of the plurality of sub-filters, is represented by $v_j(m)$ (j=1, . . . , M), a value of $v_1(m)$ is computed only for a first sub-filter (j=1) among the plurality of sub-filters, and a value of $v_j(m)$ (j=2, . . . , M) for remaining sub-filters other than the first sub-filter is obtained using a time delay relational expression in Equation 14, and Equation 14 is $v_j(m)=v_{j-1}(m-B)$, $j=2, \ldots, M$.

13. The electronic device of claim 9, wherein the echo canceller is configured to:
   deactivate an active sub-filter according to a designated condition, and
   allow only active sub-filters among the plurality of sub-filters to participate in computation of output values and allow deactivated sub-filters to be excluded from computation of output values while computing output values using the plurality of sub-filters.

14. The electronic device of claim 13, wherein the echo canceller is configured to compute performance metric values for respective active sub-filters among the plurality of sub-filters, find a maximum value or a minimum value among the computed performance metric values, and thereafter perform an operation of deactivating a sub-filter having the maximum performance metric value or the minimum performance metric value.

15. The electronic device of claim 13, wherein the echo canceller is configured to perform an operation of deactivating a sub-filter according to the designated condition until at least one active sub-filter or a predefined number of active sub-filters among the plurality of sub-filters remains.

16. The electronic device of claim 13, wherein the echo canceller is configured to control deactivation of a sub-filter so that a number of sub-filters that perform adaptation among the plurality of sub-filters becomes less than or equal to a predefined number of sub-filters.

17. An echo cancellation method, comprising:
   collecting a speaker output signal $x(n)$ at an audio output terminal;
   outputting the speaker output signal $x(n)$ through the audio output terminal and thereafter collecting a microphone input signal $y(n)$ through the microphone; and
   allowing an echo canceller to cancel an echo included in the $y(n)$ using the $x(n)$ as a reference signal and using the $y(n)$ as a target signal,
   wherein the echo cancellation method further comprises:
   configuring the echo canceller using a plurality of sub-filters, wherein the plurality of sub-filters includes M sub-filters (where M is a natural number greater than 1),
   configuring each sub-filter of the plurality of sub-filters as an adaptive filter;
   allowing the sub-filters to obtain delayed signals $x_j(n)$ ($j=1, \ldots, M$) by time-delaying the $x(n)$ using different delay values for respective sub-filters, wherein obtaining the delayed signals $x_j(n)$ is configured to satisfy Equation 15, and Equation 15 is $x_j(n)=x(n-D_j)$, $j=1, \ldots, M$, where a time delay value $D_j$ is an integer satisfying $0 \leq D_1 < D_2 < \ldots < D_M$;
   configuring inputs of each sub-filter using the $y(n)$ as a target signal and using each of the delayed signals $x_j(n)$ as a reference signal; and
   performing an output value computation operation of computing output values of respective sub-filters through filtering with respect to each input value, and selecting one of the computed multiple output values as an output value of the echo canceller.

18. The echo cancellation method of claim 17, wherein:
   obtaining the delayed signals $x_j(n)$ ($j=1, \ldots, M$) comprises computing the time delay value $D_j$ used to derive the $x_j(n)$ from the $x(n)$ using Equation 16,
   Equation 16 is $D_j=(j-1)D+D_{const}$, $j=1, \ldots, M$, where D is a constant having a positive integer value and $D_{const}$ is a constant having an integer value,
   a time difference between reference signals used by two adjacent sub-filters based on Equation 16 corresponds to D samples, and
   configuring the inputs of each sub-filter comprises allowing filter lengths of respective sub-filters to have an identical value.

19. The echo cancellation method of claim 18, further comprising performing a filter coefficient calculation operation, wherein:
   in a case where an adaptive filter algorithm for calculating filter coefficients per sample is applied to each sub-filter of the plurality of sub-filters, when there is an adaptive filter algorithm in which a formula $v(n)$ represented only by the reference signal $x(n)$ of the adaptive filter exists in a filter coefficient calculation formula present in the algorithm and in which the $v(n)$ is represented by a function $f(\bullet)$ of the $x(n)$, as given by Equation 17, Equation 17 is represented by $v(n)=f(x(n))$,
   the $v(n)$ is one of a scalar, a vector, and a matrix,
   n is a sample number,
   when $v(n)$, obtained when the adaptive filter algorithm is applied to each of the plurality of sub-filters, is represented by $v_j(n)$ ($j=1, \ldots, M$), a value of $v_1(n)$ is computed only for a first sub-filter ($j=1$) among the plurality of sub-filters, and a value of $v_j(n)$ ($j=2, \ldots, M$) for remaining sub-filters other than the first sub-filter is obtained using a time delay relational expression in Equation 18,
   Equation 18 is $v_j(n)=v_{j-1}(n-D)$, $j=2, \ldots, M$, and
   D in Equation 18 is a value identical to D in Equation 16.

20. The echo cancellation method of claim 18, further comprising performing a filter coefficient calculation operation, wherein:
   when an adaptive filter algorithm for calculating filter coefficients per frame is applied to each sub-filter of the plurality of sub-filters, new N input data samples flow in the adaptive filter in each frame and are used to form a current frame,
   when D is an integer multiple of N and satisfies Equation 19, Equation 19 is $D=BN$, where B is a positive integer value,
   D in Equation 19 is a value identical to D in Equation 16,
   values corresponding to the current frame of the reference signal $x(n)$ of the adaptive filter are collected and a value generated by including values of past frames of $x(n)$ in the collected values is represented by $X(m)$,
   m is a frame number,
   if there is an adaptive filter algorithm in which a formula $v(m)$ represented only by the $X(m)$ exists in a filter coefficient calculation formula present in the adaptive filter algorithm and in which $v(m)$ is represented by a function $f(\bullet)$ of the $X(m)$, as given by Equation 20, Equation 20 is represented by $v(m)=f(X(m))$,
   the $v(m)$ is one of a scalar, a vector, and a matrix,
   if $v(m)$, obtained when the adaptive filter algorithm is applied to each of the plurality of sub-filters, is represented by $v_j(m)$ ($j=1, \ldots, M$), a value of $v_1(m)$ is computed only for a first sub-filter ($j=1$) among the plurality of sub-filters, and a value of $v_j(m)$ ($j=2, \ldots, M$) for remaining sub-filters other than the first sub-filter is obtained using a time delay relational expression in Equation 21, and
   Equation 21 is $v_j(m)=v_{j-1}(m-B)$, $j=2, \ldots, M$.

21. The echo cancellation method of claim 17, wherein performing the output value computation operation comprises:

performing a pruning operation of deactivating an active sub-filter according to a designated condition; and allowing only active sub-filters among the plurality of sub-filters to participate in computation of output values and allowing deactivated sub-filters to be excluded from a procedure for computing the output values while computing the output values using the plurality of sub-filters.

22. The echo cancellation method of claim 21, wherein performing the pruning operation comprises:
   computing performance metric values for respective active sub-filters among the plurality of sub-filters;
   finding a maximum value or a minimum value among the computed performance metric values; and
   deactivating a sub-filter having the maximum performance metric value or the minimum performance metric value.

23. The echo cancellation method of claim 21, wherein performing the pruning operation comprises deactivating a sub-filter according to the designated condition until at least one active sub-filter or a predefined number of active sub-filters among the plurality of sub-filters remains.

24. The echo cancellation method of claim 21, wherein performing the pruning operation comprises controlling deactivation of a sub-filter so that a number of sub-filters that perform adaptation among the plurality of sub-filters becomes less than or equal to a predefined number of sub-filters.

25. The adaptive filter of claim 1, wherein the adaptive delay diversity filter is configured to:
   compute an error signal $e_j(n)$ (j=1, . . . , M) between a target estimation signal $\hat{y}_j(n)$ (j=1, . . . , M) that is computed for each sub-filter through filtering and a target input signal $y(n)$,
   compute performance metric values $p_j(n)$ (j=1, . . . , M) of respective sub-filters using the above signals,
   select a sub-filter corresponding to a maximum value or a minimum value from among the performance metric values $\{p_1(n), \ldots, p_M(n)\}$ as a best sub-filter, and
   select an output value of the best sub-filter as an output value of the adaptive delay diversity filter.

* * * * *

UNITED STATES PATENT AND TRADEMARK OFFICE
CERTIFICATE OF CORRECTION

| | |
|---|---|
| PATENT NO. | : 11,843,925 B2 |
| APPLICATION NO. | : 17/378413 |
| DATED | : December 12, 2023 |
| INVENTOR(S) | : Dong Un Yun |

It is certified that error appears in the above-identified patent and that said Letters Patent is hereby corrected as shown below:

In the Specification

| | | |
|---|---|---|
| Column 16, | Line 31, | change "1, ... , M" to --$j$ = 1, ... , $M$-- |
| Column 16, | Line 34, | change "1, ... , M" to --$j$ = 1, ... , $M$-- |
| Column 16, | Lines 41-42, | change "best sub_filter_id" to --best_sub_filter_id-- |
| Column 16, | Line 51, | change "best sub_filter_id" to --best_sub_filter_id-- |
| Column 16, | Lines 57-58, | change "best sub_filter_id," to --best_sub_filter_id,-- |
| Column 17, | Line 1, | change "best sub_filter_id" to --best_sub_filter_id-- |
| Column 20, | Line 25, | change "$\mathbf{R}_j^{-1}(n) = \lambda^{-1}\left[\mathbf{R}_f^{-1}(n-1)(n-1)\right]$," to --$\mathbf{R}_j^{-1}(n) = \lambda^{-1}\left[\mathbf{R}_j^{-1}(n-1)(n-1)\right]$-- |
| Column 22, | Line 19, | change "and $B$ is α positive" to --and $B$ is a positive-- |
| Column 26, | Line 40, | change "value $P_{m\ arg\ in}$ at" to --value $P_{marg\ in}$ at-- |
| Column 26, | Line 41, | change "value $P_{m\ arg\ in}$ at" to --value $P_{marg\ in}$ at-- |

In the Claims
| | | | |
|---|---|---|---|
| Claim 17, | Column 33, | Line 35, | change "through the microphone;" to --through a microphone;-- |

Signed and Sealed this
Thirteenth Day of February, 2024

Katherine Kelly Vidal
*Director of the United States Patent and Trademark Office*